US008503872B2

(12) United States Patent
Won et al.

(10) Patent No.: US 8,503,872 B2
(45) Date of Patent: Aug. 6, 2013

(54) DIGITAL IMAGING METHOD AND APPARATUS

(75) Inventors: Jong-hoon Won, Suwon-si (KR); Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 13/008,191

(22) Filed: Jan. 18, 2011

(65) Prior Publication Data
US 2011/0176795 A1 Jul. 21, 2011

(30) Foreign Application Priority Data

Jan. 18, 2010 (KR) .......................... 10-2010-0004483

(51) Int. Cl.
G03B 17/00 (2006.01)
G03B 3/00 (2006.01)
G03B 13/00 (2006.01)

(52) U.S. Cl.
USPC .............................. 396/79; 396/137; 348/345

(58) Field of Classification Search
USPC .................... 396/79–80, 82, 137; 348/345
See application file for complete search history.

(56) References Cited

U.S. PATENT DOCUMENTS

| 4,272,174 | A * | 6/1981 | Teramoto et al. | 396/137 |
| 7,889,268 | B2 * | 2/2011 | Terada | 348/345 |
| 2001/0040626 | A1 * | 11/2001 | Ohta et al. | 348/220 |
| 2003/0160891 | A1 * | 8/2003 | Mikamo | 348/375 |
| 2012/0050556 | A1 * | 3/2012 | Hamada | 348/220.1 |

FOREIGN PATENT DOCUMENTS

| JP | 2002-010123 A | 1/2002 |
| JP | 3526054 B2 | 5/2004 |

OTHER PUBLICATIONS

Hutchinson, Will, "How ot shoot great movies with your DSLR Video Camera", Oct. 2010, Royal Photographic Society Journal.*
Canon EOS Rebel T21 EAO550D instruction manual, pp. 1, 37, 46, 69, 120 and 124. (2010).*

* cited by examiner

Primary Examiner — Christopher Mahoney
(74) Attorney, Agent, or Firm — Drinker Biddle & Reath LLP

(57) ABSTRACT

A digital imaging apparatus and method by which an autofocus (AF) operation may be effectively performed during capture of a moving image. The apparatus performs the AF operation during the capture of the moving image when it is determined that a lens is appropriate for capturing the moving image based on received lens information and stops the AF operation during the capture of the moving image when it is determined that the lens is inappropriate for capturing the moving image. When the lens inappropriate for capturing the moving image is mounted, the AF operation may be performed using an additional switch or a manual-focus (MF) operation may be performed.

17 Claims, 24 Drawing Sheets

DIGITAL IMAGING METHOD AND APPARATUS

CROSS-REFERENCE TO RELATED PATENT APPLICATION

This application claims the benefit of Korean Patent Application No. 10-2010-0004483, filed on Jan. 18, 2010, in the Korean Intellectual Property Office, the entire disclosure of which is incorporated herein by reference.

BACKGROUND

1. Field of the Invention

The invention relates to a method of performing an auto-focus (AF) operation in a digital imaging apparatus, and more particularly, to a method of performing an AF operation during capture of a moving image in a digital imaging apparatus.

2. Description of the Related Art

A video camera by which moving images are captured may require a gentle auto-focus (AF) operation in order to prevent restrictions, such as image flickering or imaging noise, during reproduction of moving images. Conversely, a still camera may require a high-speed AF operation to rapidly seize imaging opportunities.

A conventional still camera cannot support an AF operation during capture of moving images. Also, even if a conventional video camera supports an AF operation during capture of moving images, AF noise and image flickering caused by a high-speed AF operation may be recorded.

SUMMARY

Therefore there is a need in the art for a digital imaging method and apparatus, the digital imaging apparatus for performing an auto-focus (AF) operation including a controller configured to determine based on lens information whether or not a lens of the digital imaging apparatus is appropriate for performing the auto-focus (AF) operation during the capturing of a moving image; and configured to respond to a first signal by: if the lens is determined to be appropriate for performing the AF operation during the capturing of the moving image, capturing the moving image and performing the AF operation during the capturing of the moving image; if the lens is determined to be not appropriate for performing the AF operation during capturing of the moving image, capturing the moving image.

The capturing the moving image and performing the AF operation during the capturing of the moving image may include capturing the moving image and continuously performing the AF operation during the capturing of the moving image.

The controller may be configured to respond to a second signal, by performing the AF operation; and to respond to a third signal, by capturing a still image.

The controller may further configured to respond to a fourth signal received during capturing the moving image, by: performing the AF operation during the capturing of the moving image, if the lens is determined to be not appropriate for performing the AF operation during the capturing of the moving picture.

The may controller further be configured to: if the lens is determined to be appropriate for performing the AF operation during the capturing of the moving image, perform the AF operation during the capturing of the moving image by moving the lens a small distance forward and a small distance backwards and determining a direction to move the lens based on AF calculations; and configured to: perform the AF operation by moving the lens a greater distance than the small distance forward and the small distance backward, in response to the second signal.

The controller may further be configured to: respond to a second signal by performing the AF operation; and respond to the first signal during the performing the AF operation, by stopping performing the AF operation, and capturing the moving image, if the lens is determined to be not appropriate for performing the AF operation during capturing of the moving image.

The controller may further be configured to: respond to a third signal during the capturing of the moving image, by capturing a still image.

The controller may further be configured to: disable a manual focus (MF) operation during at least one of: the performing the AF operation and a capturing of a still image.

The first signal may be generated as long as a button is pressed; and the controller may further configured to respond to the first signal no longer be generated, by stopping performing the AF operation during the capturing of the moving image.

The controller may further configured to respond to a fourth signal, by: capturing the moving image and performing the AF operation during the capturing of the moving image and disabling a manual focus (MF) operation during the AF operation, if the lens is determined to be appropriate for performing the AF operation during capturing of the moving image.

The controller may further configured to enable a manual focus (MF), wherein the MF operation is performed using at least one of: a focus-lens drive manipulator or a focus ring.

The lens may be an interchangeable lens.

The controller may further be configured to: perform the AF operation by wobbling the lens and determining a direction the lens should move based on AF calculations made from different position of the lens during the wobbling, if the lens is determined to be appropriate for performing the AF operation during the capturing of the moving image.

The lens information may include at least one of: whether the lens is capable of wobbling, or information regarding an AF drive actuator.

The digital imaging apparatus may include a shutter-release button configured to generate the first signal in response to a half-push and configured to generate the second signal in response to a full-push; the third signal is generated by a manipulation of a third switch (SMV); and the fourth signal is generated by a manipulation of a fourth switch (SPV) when the apparatus is capturing the moving image.

The digital imaging apparatus of claim may include a shutter-release button configured to generate the first signal in response to a half-push and configured to generate the second signal in response to a full-push if the apparatus is in a still image mode, and to generate the third signal in response to a full-push if the apparatus is in a moving image mode; and a third switch (SPV) configured to generate the fourth signal in response to a manipulation if the apparatus is capturing the moving image.

The digital imaging apparatus may include a fifth switch SFL configured to generate the first signal and pop up an internal flash, in response to being pressed and configured to pop up an internal flash.

A method of performing an auto-focus (AF) operation on a digital imaging apparatus may include determining based on lens information whether or not a lens of the digital imaging apparatus is appropriate for performing the auto-focus (AF) operation during the capturing of a moving image; and in response to a first signal, if the lens is determined to be appropriate for performing the AF operation during the capturing of the moving image, capturing the moving image and performing the AF operation during the capturing of the moving image; if the lens is determined to be not appropriate for performing the AF operation during capturing of the moving image, capturing the moving image and not automatically performing the AF operation during the capturing of the moving image.

Capturing the moving image and performing the AF operation during the capturing of the moving image, may include capturing the moving image and continuously performing the AF operation during the capturing of the moving image.

The method may include in response to a second signal, performing the AF operation; and in response to a third signal, capturing a still image.

The method may include in response to a fourth signal received during capturing the moving image, if the lens is determined to be not appropriate for performing the AF operation during the capturing of the moving picture, performing the AF operation during the capturing of the moving image.

If the lens is determined to be appropriate for performing the AF operation during the capturing of the moving image may include performing the AF operation during the capturing of the moving image by moving the lens a small distance forward and moving the lens a small distance backward and determining a direction the lens should move based on AF calculations; and wherein in response to a second signal, may include performing the AF operation, further comprises: performing the AF operation by moving the lens a greater distance than the wobbling.

The method may include in response to a second signal, performing the AF operation; and in response to the first signal during the performing the AF operation, if the lens is determined to be not appropriate for performing the AF operation during capturing of the moving image, stopping performing the AF operation, and capturing the moving image The method may include in response to a third signal during the capturing of the moving image, capturing a still image.

The method may include disabling a manual focus (MF) operation during at least one of: the performing the AF operation and a capturing of a still image.

The method may include wherein the first signal is generated as long as a button is pressed; and in response to the first signal no longer be generated, stopping performing the AF operation during the capturing of the moving image.

In response to a third signal may include in response to a fourth signal, if the lens is determined to be appropriate for performing the AF operation during capturing of the moving image, capturing the moving image and performing the AF operation during the capturing of the moving image and disabling a manual focus (MF) operation during the AF operation.

The method may include enabling a manual focus (MF), wherein the MF operation is performed using at least one of: a focus-lens drive manipulator or a focus ring.

The lens may be an interchangeable lens.

The method may include if the lens is determined to be appropriate for performing the AF operation during the capturing of the moving image, by wobbling the lens and determining a direction the lens should move based on AF calculations made from different position of the lens during the wobbling.

The lens information may include at least one of: whether the lens is capable of wobbling, o information regarding an AF drive actuator.

The first signal may be generated in response to a half-push of a shutter-release button. The second signal may be generated in response to full-push the shutter-release button. The third signal may be generated by a manipulation of a third switch (SMV). The fourth signal may be generated by a manipulation of a fourth switch (SPV) when the apparatus is capturing the moving image.

The first signal may be generated in response to a half-push of a shutter-release button. The second signal may be generated in response to a full-push of the shutter-release button if the apparatus is in a still image mode. The third signal may be generated in response to a full-push of the shutter-release button if the apparatus is in a moving image mode. The fourth signal may be generated by a manipulation of a third switch (SPV) when the apparatus is capturing the moving image.

The first signal may be generated by a fifth switch SFL configured to pop up an internal flash.

A method of performing an auto-focus (AF) operation on a digital imaging apparatus may include in response to a first signal, capturing a moving image and performing multiple AF operation during the capturing of the moving image by performing the AF operation during the capturing of the moving image by moving the lens a small distance forward and moving the lens a small distance backward and determining a direction the lens should move based on AF calculations, and moving the lens in the determined direction; in response to a second signal, performing the AF operation by moving the lens a greater distance than the small distance forward and the small distance backward and determining a direction the lens should move based on AF calculations, and moving the lens in the determined direction; and in response to a third signal, capturing a still image.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The invention will now be described more fully with reference to the accompanying drawings, in which exemplary embodiments of the invention are shown.

Construction and Operation of Digital Imaging Apparatus

Figure 1:
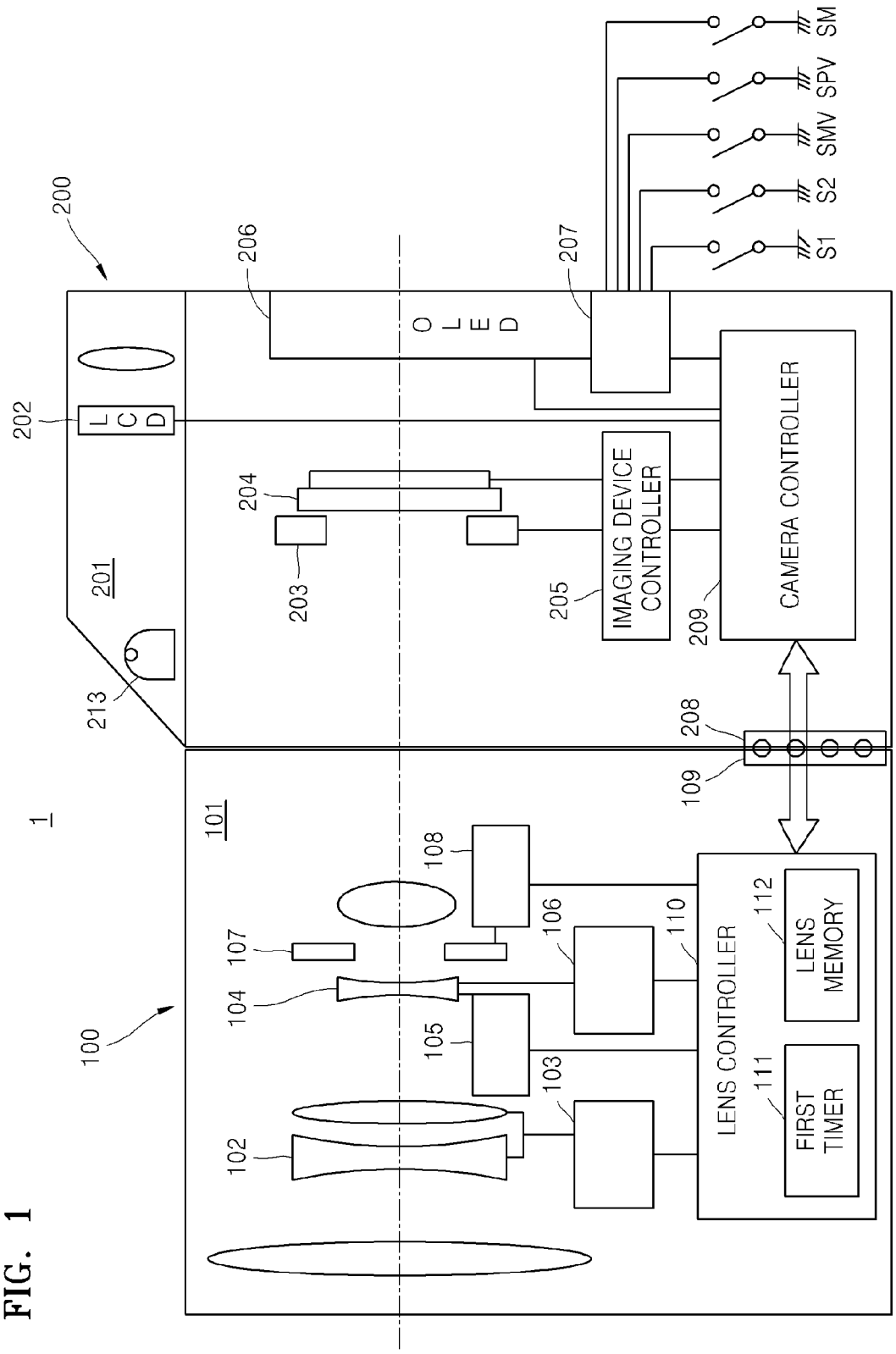
FIG. 1 is a diagram of a digital imaging apparatus according to an exemplary embodiment of the invention.
Figure 7:
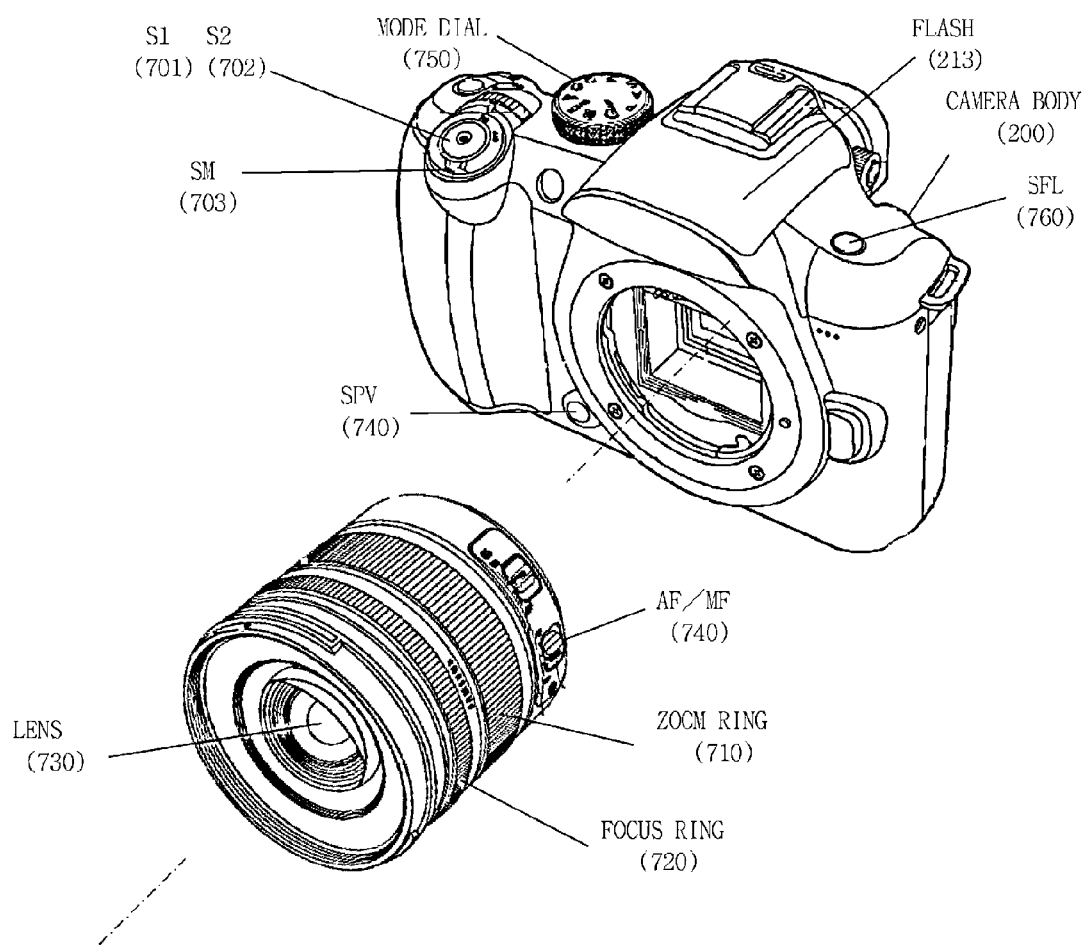
FIG. 7 is a front view of a digital imaging apparatus as a camera, according to an exemplary embodiment of the invention.
Figure 8:
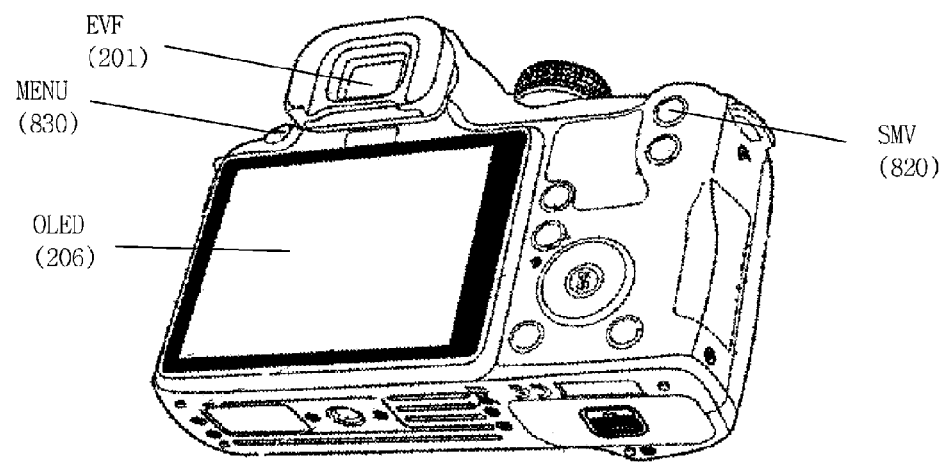
FIG. 8 is a rear view of the digital imaging apparatus as a camera, according to an exemplary embodiment of the invention.

FIG. 1 is a diagram of a digital imaging apparatus 1 according to an exemplary embodiment of the invention. FIG. 1 is a schematic view of a digital imaging apparatus of FIGS. 7 and 8. FIG. 7 is a front view of the digital imaging apparatus 1 as a camera, according to an exemplary embodiment of the invention, and FIG. 8 is a rear view of the digital imaging apparatus 1 as a camera, according to an exemplary embodiment of the invention.

Referring to FIG. 1, the digital imaging apparatus 1 according to the embodiment may include an interchangeable lens 100 and a camera body 200. The interchangeable lens 100 may function to detect a focus, and the camera body 200 may function to allow the interchangeable lens 100 to drive a focus lens 104.

The interchangeable lens 100 (hereinafter, "lens") may include an imaging optical system 101, a zoom lens position sensor 103, a lens drive actuator 105, a focus lens position sensor 106, an iris drive actuator 108, a lens controller 110, and a lens mount 109.

The camera body 200 may include a view finder EVF 201, a shutter 203, an imaging device 204, an imaging device controller 205, a display 206, an internal pop-up flash 213, a manipulator 207, a camera mount 208, and a camera controller 209. The manipulator 207 may be a portion to which a user inputs various commands to manipulate the digital imaging apparatus 1. The manipulator 207 may include a shutter-release button, a main switch, a mode dial, and a menu button.

In FIGS. 7 and 8, S1 denotes a first switch 701 configured to half-push a shutter-release button, S2 denotes a second switch 702 configured to full-push the shutter-release button, SMV denotes a moving-image switch 820 configured to capture a moving image, SPV denotes a preview switch 740 configured to control a preview on a still screen or initiate auto-focus (AF) in a moving image, SM denotes a main switch 703, MENU denotes a menu button 830 configured to change the function of the preview switch SPV 740, and SFL denotes a flash switch 760 configured to pop up the internal flash to prepare for light emission. The menu button MENU 830 may change the function of a switch, such as the preview switch SPV 740. A mode dial 750 may set a still image mode and a moving image mode.

The imaging optical system 101 may include a zoom lens 102 configured to perform a zoom operation, the focus lens 104 configured to change a focal position, and an iris diaphragm 107. Each of the zoom lens 102 and the focus lens 104 may include a lens group having a plurality of lenses.

Each of the zoom lens position sensor 103 and the focus lens position sensor 106 may sense positions of the zoom lens 102 and the focus lens 104, respectively. A time point at which the position of the focus lens 104 is sensed may be set by the lens controller 110 or the camera controller 209 of FIG. 2. For example, the time point at which the position of the focus lens 104 is sensed may be a time point at which AF detection is performed in response to an image signal.

The lens drive actuator 105 and the iris drive actuator 108 may be controlled by the lens controller 110 to drive the focus lens 104 and the iris diaphragm 107, respectively. In particular, the lens drive actuator 105 may drive the focus lens 104 in an optical axial direction.

Referring to FIG. 7, a lens 730 may be a lens optical system, a zoom ring 710 may be a ring configured to manipulate a zoom, and a focus ring 720 may be a ring configured to control a manual-focus (MF) operation. Also, the preview switch SPV 740 may be switched between an AF mode and a MF mode.

The lens controller 110 may include a first timer 111 configured to measure a time and a lens memory 112 configured to store information regarding the characteristics of a lens. Also, the lens controller 110 may transmit positional information of the sensed focus lens 104 to the camera body 200. When the position of the focus lens 104 is changed or when the positional information of the focus lens 104 is requested from the camera controller 209, the positional information of the sensed focus lens 104 may be transmitted to the camera body 200. The first timer 111 may be reset in response to a reset signal of the camera body 200. Time points at which the interchangeable lens 100 and the camera body 200 start to operate may be synchronized due to the reset operation.

The lens mount 109 may include the lens-side communication pins, which may be interlocked with camera-side communication pins that will be described later. The lens-side communication pins may be used as transmission paths of data and control signals.

Next, the construction of the camera body 200 will be described.

The view finder EVF 201 may be embedded in a liquid crystal display (LCD) 202 and allow a user to see a captured image in real time. The internal pop-up flash 213 may irradiate light to a dark subject.

The shutter 203 may determine an amount of time for which the imaging device 204 is irradiated with or exposed to light.

The imaging device 204 may capture image light passing through the imaging optical system 101 of the interchangeable lens 100 and generate an image signal. The imaging device 204 may include a plurality of photoelectric converters arranged in a matrix and a vertical and/or horizontal transmission routes through which charges are moved from the photoelectric converters to read the image signal. The imaging device 204 may employ a charge-coupled device (CCD) sensor or a complementary metal-oxide semiconductor (CMOS) image sensor (CIS).

The imaging device controller 205 may generate a timing signal and control the imaging device 204 to capture an image in synchronization with the timing signal. Also, the imaging device controller 205 may sequentially read out a horizontal image signal when accumulation of charges ends in each scan line. The read horizontal image signal may be used for AF detection in the camera controller 209.

A variety of images and information may be displayed on the display 206. The display 206 may be an organic light-emitting diode (OLED) display.

The camera controller 209 may perform AF detection in response to the image signal generated by the imaging device 204 and calculate an AF estimation value. Also, the camera controller 209 may store the AF estimation value at every AF detection time point in response to the timing signal generated by the imaging device controller 205 and calculate a focal position using the lens position information transmitted from the interchangeable lens 100 and the stored AF estimation value. The calculation result of the focal position may be transmitted to the interchangeable lens 100.

The camera mount 208 may include the camera-side communication pins.

Hereinafter, schematic operations of the interchangeable lens 100 and the camera body 200 will be described.

When the image of a subject is captured, a main switch SM included in the manipulator 207 may be manipulated to initiate operation of the digital imaging apparatus 1. The digital imaging apparatus 1 may perform a live view display operation as follows.

Light of the image of the subject may be transmitted through the imaging optical system 101 and incident to the imaging device 204. In this case, the shutter 203 may remain open. The imaging device 204 may convert the incident light of the subject into an electric signal and generate an image signal. The imaging device 204 may operate in response to the timing signal generated by the imaging device controller 205. The camera controller 209 may convert the generated image signal of the subject into data capable of being displayed and output the data to the view finder EVF 201 and the display 206. The above-described operation may be the live-view display operation, and a live-view image displayed during the live-view display operation may be sequentially displayed as a moving image.

After the live-view display operation, when the shutter-release button included in the manipulator 207 is half-pushed (S1), the digital imaging apparatus 1 may initiate an AF operation.

The AF operation may be performed using an image signal generated by the imaging device 204. In a contrast AF method, a focal position may be calculated based on an AF estimation value related with a contrast value, and the interchangeable lens 100 may be driven based on the calculation result. The AF estimation value may be calculated by the camera controller 209. The camera controller 209 may calculate information required for controlling the focus lens 104 based on the AF estimation value and transmit the calculated information to the lens controller 110 via communication pins included in the lens mount 109 and the camera mount 208.

The lens controller 110 may control the lens drive actuator 105 based on the received information, drive the focus lens 104 in the optical axial direction, and perform an AF operation. The position of the focus lens 104 may be monitored by the focus lens position sensor 106 to control feedbacks.

When the user zooms the zoom lens 102, the zoom lens position sensor 103 may detect the position of the zoom lens 102, and the lens controller 110 may vary AF control parameters of the focus lens 104 and perform an AF operation again. The AF control parameters may be stored as intrinsic information of the interchangeable lens in the lens memory 112. When the position of the zoom lens 102 is changed, a focus-lens drive amount and a conversion coefficient of a focal deviation of an imaging lens may be changed. The AF control parameter may include the changed focus-lens drive amount and changed conversion coefficient of the focal deviation of the imaging lens.

When the image of the subject is focused due to the above-described operation, the shutter-release button may be full-pushed using the second switch S2 702 so that the digital imaging apparatus 1 may perform an exposure operation. In this case, the camera controller 209 may initially completely shut the shutter 203 and transmit currently obtained light measurement information as iris control information to the lens controller 110.

The lens controller 110 may control the iris drive actuator 108 based on the iris control information and set the iris diaphragm 107 at an appropriate aperture value. The camera controller 209 may control the shutter 203 based on the light measurement information, open the shutter 203 for an appropriate exposure time, and capture the image of the subject. In the moving image mode, the digital imaging apparatus 1 may capture a moving image of the subject, and finish capturing the moving image when the second switch S2 702 is turned off.

Figure 2:
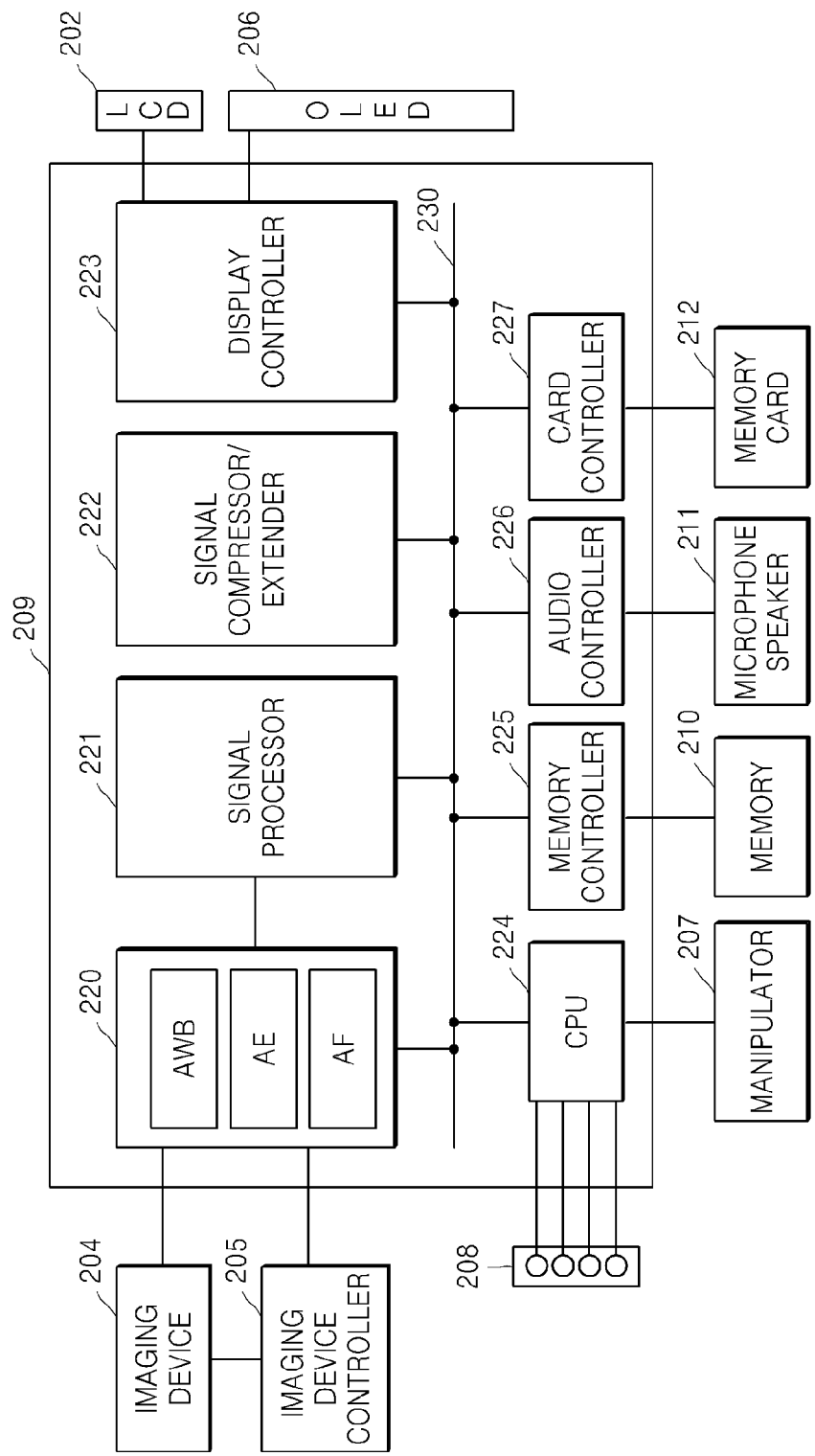
FIG. 2 is a diagram of a camera controller of the digital imaging apparatus of FIG. 1, according to an exemplary embodiment of the invention.

The captured image may undergo an image-signal processing operation and a compression operation and be stored in a memory card (refer to 212 in FIG. 2). Simultaneously, the captured image may be output on the display 206 of the view finder EVF 201, which may be configured to display the subject. In this case, the captured image may be referred to as a quick-view image. An example of the display 206 may be the OLED display. According to the above-described process, a series of imaging operations may be completed.

The moving image of the subject may be captured and compressed at the same time and stored in the memory card 212. During the capture of the moving image, the live-view image may be displayed instead of the quick-view image.

The digital imaging apparatus 1 may be changed into the still image mode or the moving image mode using the manipulator 207. When the first switch S1 701 is turned on, the still image mode and the moving image mode may involve the same operations. When the second switch S2 702 is turned on, a still image may be captured in the still image mode, while a moving image may be captured in the moving image mode.

FIG. 2 is a diagram of the camera controller 209 of the digital imaging apparatus 1 of FIG. 1, according to an embodiment of the invention.

Referring to FIG. 2, the camera controller 209 may include a pre-processor 220, a signal processor 221, a compressor/extender 222, a display controller 223, a central processing unit (CPU) 224, a memory controller 225, an audio controller 226, a card controller 227, and a main bus 230.

The camera controller 209 may transmit various commands and data to respective units of the camera controller 209 through the main bus 230.

The pre-processor 220 may receive an image signal generated by the imaging device 204 and perform an auto white balance (AWB) operation, an auto exposure (AE) operation, and an auto-focus (AF) operation. Specifically, the pre-processor 220 may calculate an AF estimation value for AF control, an AE estimation value for exposure control, and an AWB estimation value for a white-balance control.

The signal processor 221 may perform a series of image-signal processing operations, such as gamma correction, and produce a live-view image or captured image that may be displayed on the display 206.

The compressor/extender 222 may compress or extend the processed image signal. In a compression operation, the image signal may be compressed using, for example, a JPEG compression method or H.264 compression method. An image file containing image data generated by the compression operation may be transmitted to and stored in the memory card 212.

The display controller 223 may control the output of an image to a display screen, such as the LCD 202 or the display 206 of the view finder EVF 201.

The CPU 224 may control all of the operations of the respective units of the camera controller 209. Also, in the digital imaging apparatus 2 of FIG. 6, the CPU 224 may communicate data and signals with the lens controller 110 of the interchangeable lens 100.

The memory controller 225 may control a memory 210 configured to temporarily store a captured image or data, such as associated information, and the audio controller 226 may control a microphone or speaker 211. Also, the card controller 227 may control the memory card 212 configured to store the captured image.

Hereinafter, a schematic operation of the camera controller 209 will be described.

When the CPU 224 senses that the main switch SM is turned on, the CPU 224 may operate the imaging device controller 205 using the pre-processor 220. The imaging device controller 205 may output a timing signal and operate the imaging device 204. When the imaging device 204 applies an image signal to the pre-processor 220, AWB and AE operations may be performed. Results of the AWB and AE operations may be fed back to the imaging device controller 205. Afterwards, the camera controller 209 may obtain an image signal with an appropriate exposure value and color output from the imaging device 204.

Meanwhile, when the operation of the digital imaging apparatus 1 is initiated, a live-view display operation may be performed. The camera controller 209 may input the image signal captured with the appropriate exposure value to the pre-processor 221 and calculate the AE estimation value. An image signal for the live-view display operation may not pass through the main bus 230 and be directly applied to the signal processor 221. The signal processor 221 may process the image signal, for example, process interpolation of pixels. The processed image signal may be displayed on the LCD 202 or the display 206 through the main bus 230 and the display controller 223.

When a shutter-release button is half-pushed by turning on the first switch S1, the CPU 224 may sense a turned-on state of the first switch S1, a command to initiate the drive of the focus lens 104 for an AF operation may be transmitted to the lens controller 110 through the camera mount 208 and the lens mount 109.

The CPU 224 may obtain an image signal from the imaging device 204, and the pre-processor 220 may calculate an AF estimation value. The AF estimation value may be calculated according to the motion of the focus lens 104. A position of the focus lens 104 where the contrast of the image of the subject is maximized or the AF estimation value is maximized may be calculated using the calculated AF estimation value, and the focus lens 104 may be moved to the calculated position. The above-described operation may be referred to as an AF operation. The live-view image display operation may be continued even during the AF operation. The image signal used for the live-view image display operation may be the same as the image signal used for the calculation of the AF estimation value.

Meanwhile, in the digital imaging apparatus 1 using the interchangeable lens 100 as shown in FIG. 1, communication between the interchangeable lens 100 and the camera body 200 may be enabled using communication pins installed in the camera mount 208 and the lens mount 109 during the AF operation.

When the shutter-release button is full-pushed by turning on the second switch S2, the AF operation may be stopped in a still image mode. Also, in a moving image mode, the AF operation may be maintained when the digital imaging apparatus 1 includes a lens appropriate for capturing a moving image, and continuously repeated even after the focus lens 104 is focused. However, in this case, the focus lens 104 may be driven at low speed, thus reducing sound or a variation in angle of view during the capture of the moving image.

Peak Detection

Figure 3:
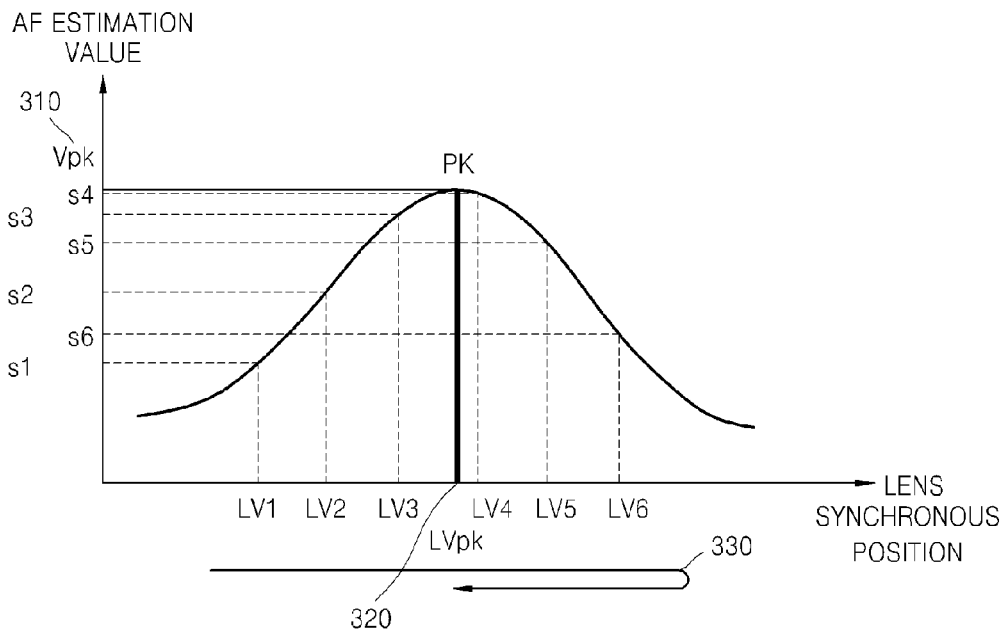
FIG. 3 is a graph showing an example of an operation of detecting a peak value of an auto-focus (AF) estimation value in a still image mode.
Figure 4:
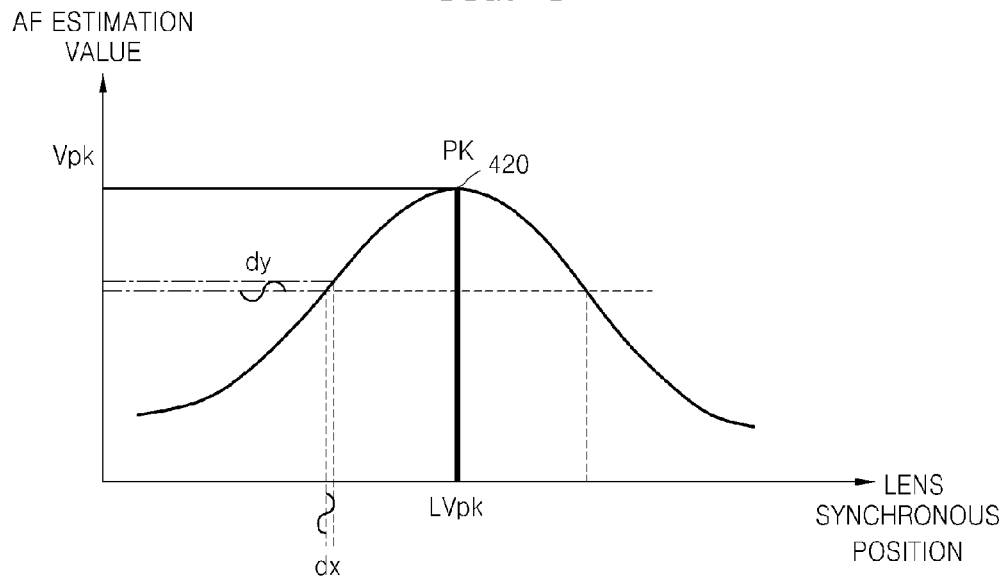
FIG. 4 is a graph showing an example of an operation of detecting a peak value of an AF estimation value in a moving image mode, according to an exemplary embodiment of the invention.

FIGS. 3 and 4 are graphs illustrating an operation of detecting a peak value of an AF estimation value in a contrast AF method. FIG. 3 is a graph showing an example of an operation of detecting a peak value of an AF estimation value in a still image mode, and FIG. 4 is a graph showing an example of an operation of detecting a peak value of an AF estimation value in a moving image mode.

In FIG. 3, an x-axis denotes a synchronous position of a lens, and a y-axis denotes an AF estimation value. Each AF estimation value and a focal position corresponding thereto may be stored in the lens memory 112. In a contrast AF method, a synchronous position LVpk 320 corresponding to a peak value Vpk 310 of AF estimation values may be determined to be the focus of the focus lens 104.

In this case, since AF estimation values are discrete, an actual peak value may be obtained by performing an interpolation calculation on the AF estimation values. The actual peak may correspond to coordinates (LVpk, Vpk) (320, 310). For example, the interpolation calculation may be performed on lens synchronous positions LV3, LV4, and LV5 and AF estimation values L(s3), L(s4), and L(s5) corresponding thereto.

Central points of charge accumulation times of the AF estimation values, namely, detection central positions LV1, LV2, LV3 . . . , may be defined as the lens synchronous positions. Information regarding the lens synchronous positions may be obtained using the lens (refer to 100 in FIG. 1). By adjusting a time in a lens to a time in a camera, position information stored in the lens at time points of the lens synchronous positions LV1, LV2, . . . may be obtained.

By detecting the lens positions at the time points synchronized with the determined detection central positions LV1, LV2, LV3 . . . , the focus lens 104 may be driven to a target position where the focus lens 104 is in focus.

Referring to FIG. 3, an increase in AF speed may lead to AF noise or a variation in angle of view. When the focus lens 104 moves along a direction of an arrow 330 of FIG. 3, the variation in angle of view may be increased. Since an AF operation is performed once before capture of a still image in a still image mode, the AF noise or the variation in angle of view may not be greatly considered. However, since the AF operation may be repeated during capture of a moving image in a moving image mode to adjust the focus of a lens, the AF noise or the variation in angle of view may be problematic. In order to reduce this problem, an exclusive lens for a moving image may be used during the capture of the moving image.

FIG. 4 is a graph showing detection of a peak value of an AF estimation value using an exclusive lens for moving images, according to an exemplary embodiment of the invention. In FIG. 4, an x-axis denotes a synchronous position (or focal position) of a lens, and a y-axis denotes an AF estimation value.

In a moving image mode, although the peak value of an AF estimation value may be obtained to achieve the same object as in the still image mode, a focus lens may be controlled using a different method than described with reference to FIG. 3. In the moving image mode, a focal position may be obtained using differential components (dy/dx) of an estimation value obtained by minutely oscillating the focus lens. A direction in which the focal position is disposed based on the current position of the focus lens may be inferred using the differential components (dy/dx). The minute oscillation of the focus lens may be referred to as wobbling. In a live-view mode, the focus lens may be moved in the direction of an arrow 430 by varying an angle of view to an extent as not to allow a person to recognize the angle of view. The focus lens may be driven in the above-described manner and stopped when a point 420 where the differential components (dy/dx) reach zero (0) is obtained as a peak. Thus, the focus of the focus lens may be detected.

In order to enable gentle wobbling, an appropriate actuator and driving mechanism may be required. The wobbling of the focus lens may be performed using a stepping motor, a voice-coil motor (VCM), or a piezoelectric actuator. However, a slow-response motor, such as a direct-current (DC) motor, may be inappropriate for the wobbling of the focus lens. Thus, an interchangeable lens using a DC motor may be incapable of wobbling. Also, even if an appropriate motor is adopted, a lens including a drive mechanism having great backlash, that is, an interchangeable lens having an inappropriate drive mechanism, may be incapable of wobbling.

Embodiment 1

FIGS. 10 through 18 are flowcharts of operations of digital imaging apparatuses.

Figure 10:
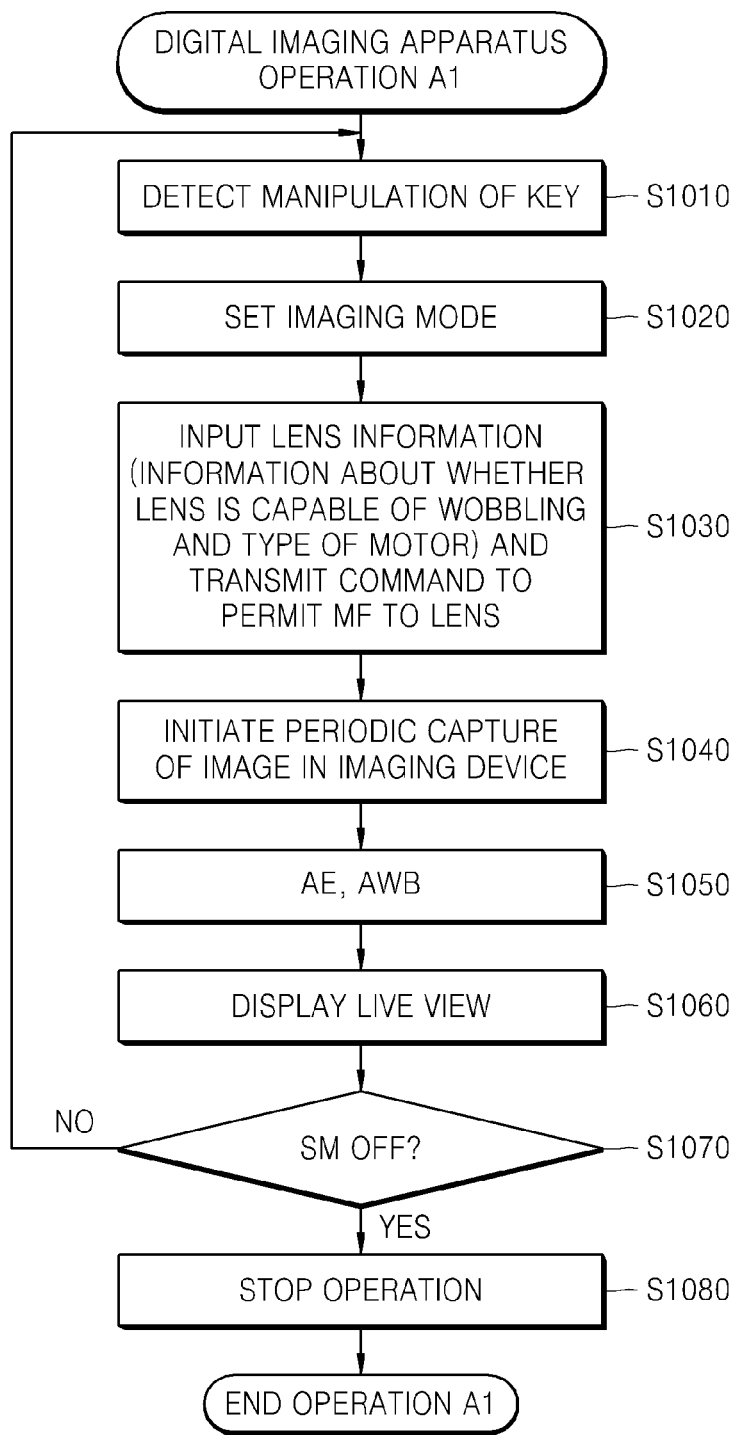
FIG. 10 is a flowchart of a drive operation of a digital imaging apparatus, according to an exemplary embodiment of the invention.

FIG. 10 is a flowchart of a drive operation of a digital imaging apparatus according to an exemplary embodiment of the invention. When a main switch SM of the digital imaging apparatus is turned on, a button, such as a menu button 830, or a mode dial 750 may be manipulated to select a still image mode or an imaging mode, such as a moving image mode.

Also, an AF mode or a MF mode may be selected (S1010, S1020). When the AF mode is selected, a single AF operation in which an AF operation is performed only once or a continuous AF operation in which the AF operation is sequentially performed may be selected. When an imaging mode is a single image mode, the single AF operation may be performed, and when the imaging mode is a moving image mode, the continuous AF operation may be performed (S1020). In the MF mode, the AF operation may not be performed, and the focus ring 720 of the lens 730 may be manipulated to adjust the focus of the lens 730.

Afterwards, in the case of an interchangeable lens, lens information required for operation of the digital imaging apparatus may be input to the interchangeable lens (S1030). The lens information may include intrinsic parameters stored in the lens memory (refer to 112 in FIG. 1) to enable AF, AE, AWB, and resolution control operations. In addition, the lens information may further include information about whether the lens is capable of wobbling and information regarding the type of motor. Thereafter, the focus ring 720 of the interchangeable lens may be manipulated to transmit a command to permit a MF operation.

The imaging device (refer to CIS 204 in FIGS. 1 and 2) may periodically initiate capture of images (S1040). Afterwards, an operation on AE and AWB values may performed (S1050), and a live view may be displayed (S1060). Although operations S1010 through S1060 are sequentially described above, it should be noted that operations S1010 through S1060 may be performed simultaneously while inputting image information from the imaging device.

It may be confirmed whether a main switch SM of the digital imaging apparatus is turned off (S1070). Thus, when the main switch SM is not turned off, the process may return to operation S1010, and a live-view display operation may be repeated. Otherwise, when the main switch SM is turned off, the operation of the digital imaging apparatus may be stopped (S1080).

Figure 11:
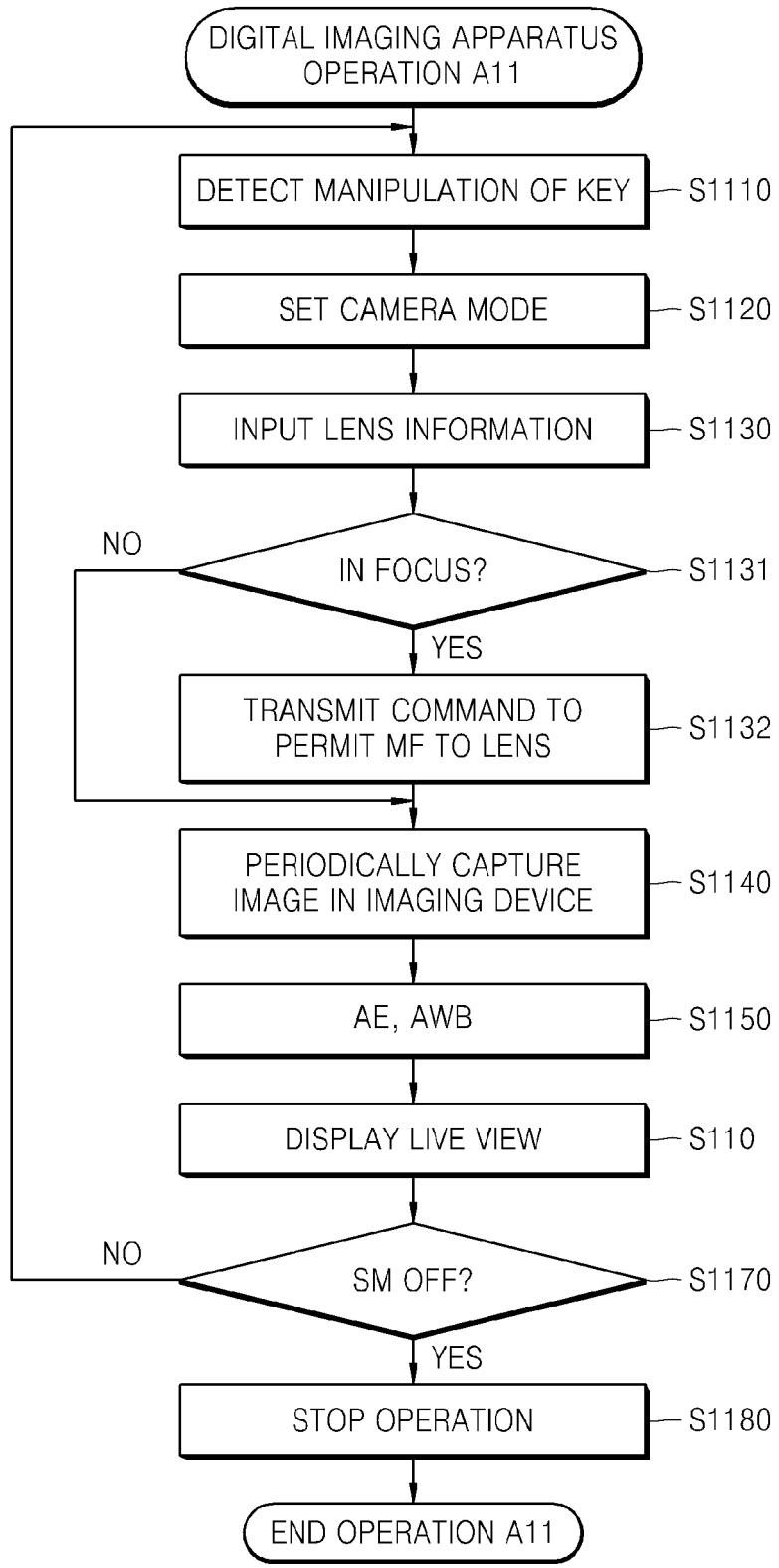
FIG. 11 is a flowchart of a drive operation of a digital imaging apparatus, according to another exemplary embodiment of the invention.

FIG. 11 is a flowchart of a drive operation of a digital imaging apparatus, according to another exemplary embodiment of the invention.

Specifically, FIG. 11 is a flowchart of operation A11 of the digital imaging apparatus, according to another exemplary embodiment of the invention, which may differ from operation A1 of FIG. 10. In operation A11, a MF operation may be performed only when the focus of a lens is determined by performing an AF operation, unlike in operation A1 of FIG. 10 (S1131 to S1132).

Figure 12A:
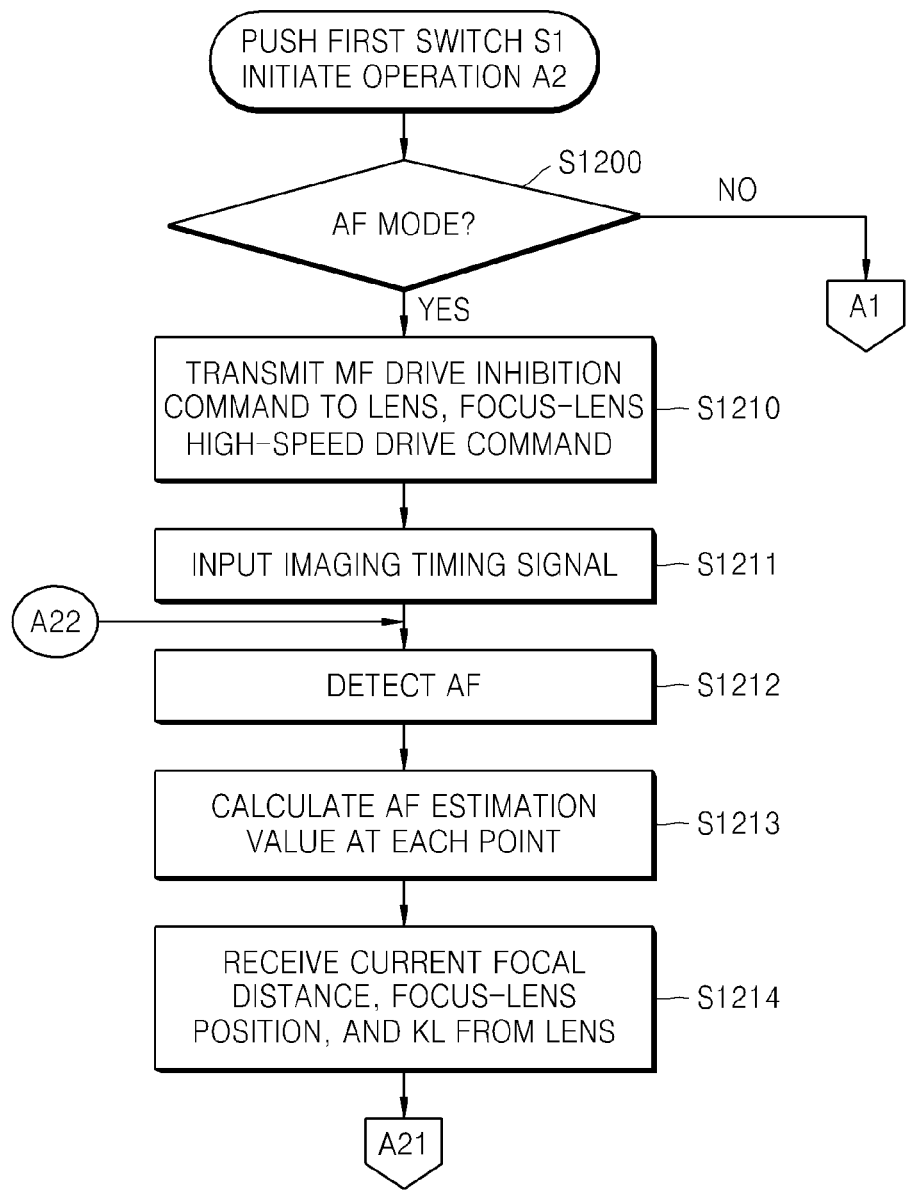
FIGS. 12A and 12B are flowcharts of an interruption operation when a first switch is turned on to half-push a shutter-release button.
Figure 12B:
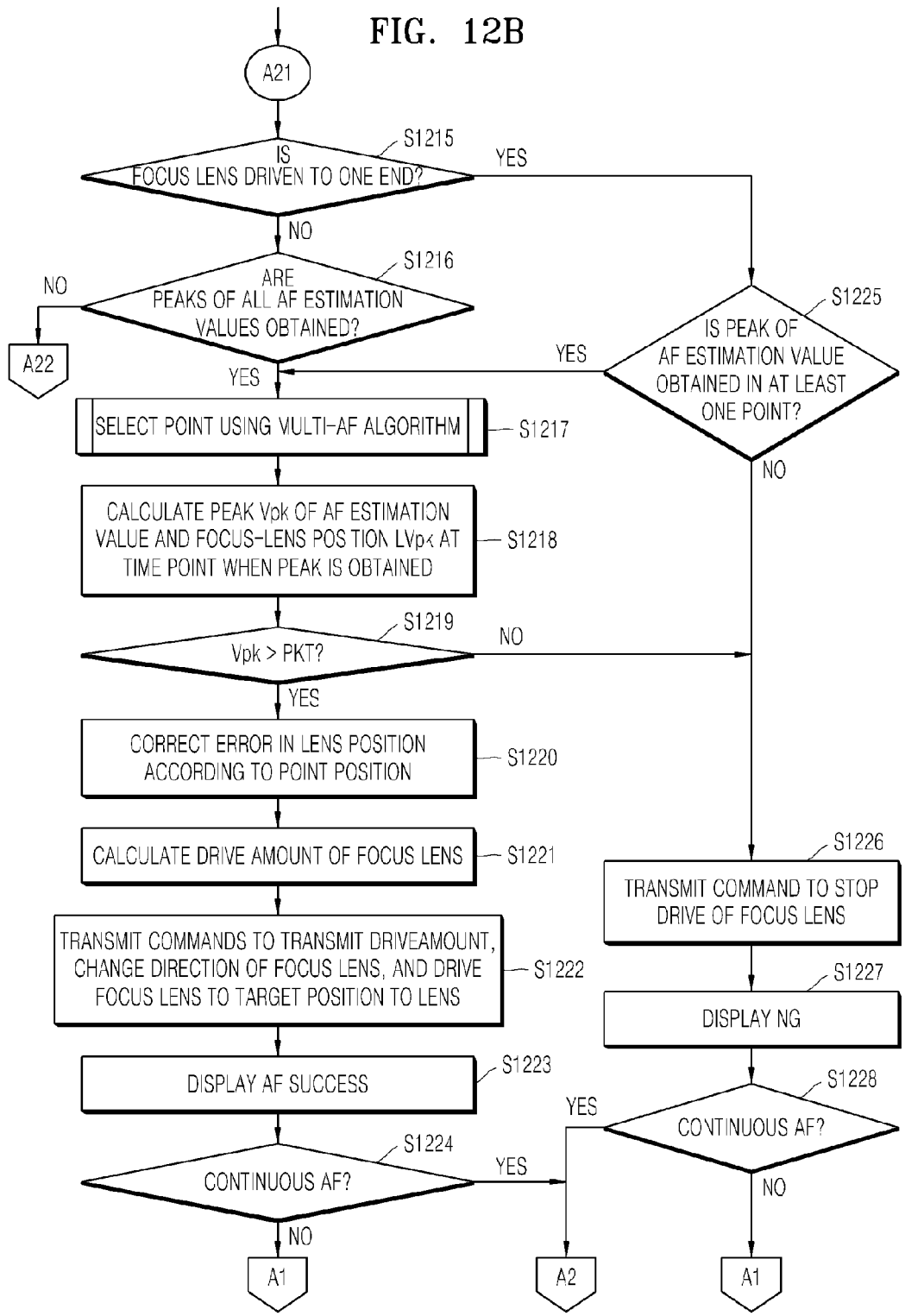

FIGS. 12A and 12B are flowcharts of an interruption operation when a first switch S1 is turned on to half-push a shutter-release button.

Referring to FIGS. 12A and 12B, the shutter-release button may be half-pushed during a live-view display operation so that when a switch S1 is turned on, operation A2 may be initiated. In operation A2, it may be determined that an AF mode is selected (S1200). When the AF mode is not selected, the process may return to operation A1 of FIG. 10 and a live-view display operation may be repeated. In operation A1, a manual-focus (MF) operation may be enabled.

Otherwise, when the AF mode is selected in operation S1200, an AF operation may be initiated. The MF operation of the lens may be prevented from being performed during an AF operation. This is because a contrast AF peak of FIG. 3 cannot be detected when the MF operation is performed during the AF operation. When operation A2 is initiated, a MF drive inhibition command may be transmitted (S1210). Also, a high-speed drive command may be transmitted to the interchangeable lens 100 to drive the focus lens 104 at a high speed (S1210). The lens controller 110 may drive the focus lens 104 at a constant speed to perform a contrast AF operation.

When the focus lens 104 starts to be driven, an imaging timing signal may be applied to the CPU 224 (S1211). The imaging timing signal, which may initiate AF detection, may be generated according to a focus detection region. The CPU 224 may count the number of times a drive signal is generated by the imaging device controller 205 through the pre-processor 220 and determine a time point when an AF detection operation is initiated when a predetermined number of times is counted.

When the imaging timing signal is input, an image signal of an AF point may be transmitted from the imaging device 204 to an AF detection circuit of the pre-processor 220 to perform the AF detection operation (S1212). Due to the AF detection operation, AF estimation values L1 to L15 of 15 respective multi-AF points may be calculated (S1213).

By calculating the AF estimation values L1 to L15, a current focal distance from the interchangeable lens 100, a position of the focus lens 104 at an AF detection time point, and the current drive amount and a conversion coefficient KL of a focal deviation of the focus lens 104 may be obtained. A set of the KL value and the AF estimation value may be stored (S1214).

Furthermore, it may be determined whether the focus lens 104 is driven to one end (S1215). When the focus lens 104 is not driven to one end, it may be determined whether all peaks of the AF estimation values L1 to L15 are calculated (S1216). When all the peaks of the AF estimation values L1 to L15 are not calculated, the process may return to operation S1211.

Meanwhile, there may be cases where the focus lens 104 may be driven to one end during the AF operation before all the peaks of multi-AF points are calculated. In these cases, the process may skip to operation S1225 to determine whether a peak of an AF estimation value is obtained in at least one point of the multi-AF points (S1225). When the peak of the AF estimation value is obtained at even one point, the process may enter operation S1217.

On the other hand, when there is no point where a peak of an AF estimation value is obtained, it may be determined that AF control has failed. Thus, a command to stop the drive of the focus lens 104 may be transmitted to the interchangeable lens 100 (S1226). Afterwards, AF failure may be displayed (S1227), and it may be determined whether an AF mode is a continuous AF mode or a single AF mode (S1228). When the AF mode is the continuous AF mode, the process may return to operation A2 (S1200) to repeat the AF operation. Otherwise, when the AF mode is the single AF mode, the process may return to operation A1 of FIG. 10 to repeat a live-view display operation. In operation A1, a MF operation may be enabled.

The process may return to operation A1 of FIG. 10 to display a live view. When a peak in a contrast AF is obtained, a subject may be determined according to a multi-AF algorithm using the AF estimation values calculated in operation S1213 (S1217). Here, any one of a method of applying the multi-AF algorithm to all the 15 multi-AF points or a method of applying the multi-AF algorithm to only a peak detection point of the 15 multi-AF points may be adopted. In general, a point including a subject whose peak position is closest to a camera may be selected to adjust the focus of a lens. However, when the subject has a higher magnifying power than a predetermined magnifying power, a central region may be selected to increase the probability of focus adjustment. For example, an advanced photo system type-C (APS-C) format may have a predetermined magnifying power of about 1/50 or 1/60.

After a multi-point including a subject is selected according to the multi-AF algorithm, a peak Vpk of the AF estimation value may be obtained at a selected point. A focus-lens position LVpk of the point where the peak Vpk of the AF estimation value is obtained may be calculated using interpolation calculation (S1218).

It may be determined whether the calculated peak Vpk is greater than a reference value PKT (S1219). When If the peak Vpk is greater than the reference value PKT, it may be determined that AF control is possible. Otherwise, when the peak Vpk is not greater than the reference value PKT in operation S1220, it may be determined that the AF control is impossible and the process may enter operation S1226. Also, a correction coefficient required for a correction operation may be received from the interchangeable lens 100 to correct an error in lens position according to the position of a selected point (S1220).

The error in lens position may occur due to a difference between an imaging lens and an AF detection frequency. Also, the error in lens position may vary according to the position of a focus detection point. Thus, the error in lens position may be corrected in consideration of an error ΔIB caused by the difference between the imaging lens and the AF detection frequency and an error ΔIBoff varying according to the position of the focus detection point. Here, the error ΔIBoff may be previously determined according to a selected focus detection point.

Since the lens position may be corrected in terms of um, the lens position may be converted into the drive amount of the focus lens (S1221). The drive amount of the focus lens may be calculated by ΔLVpk×KL. A value obtained at a point closest to the focus-lens position LVpk may be used as a conversion coefficient KL of a focal deviation.

Thereafter, the drive amount of the focus lens may be transmitted to the interchangeable lens 100, a reverse drive command may be transmitted to the focus lens 100, and a focus-lens high-speed drive command may be transmitted to a target position (S1222). Thus, the interchangeable lens 100 may initiate a reverse drive operation of the focus lens 104 and drive the focus lens 104 to a target position to adjust the focus of the focus lens 104. When the focus of the focus lens 104 is successfully adjusted, AF success may be displayed (S1224), and the AF operation may be ended. Also, an AF mode may be determined in operation S1224. When the AF mode is a continuous AF mode, the process may return to operation A2 (S1200) to continue the AF operation. Otherwise, when the AF mode is a single AF mode, the AF operation may be ended. Also, the process may return to operation A1 of FIG. 10 to repeat a live-view display operation. In operation A1, a MF operation may be performed.

Figure 13:
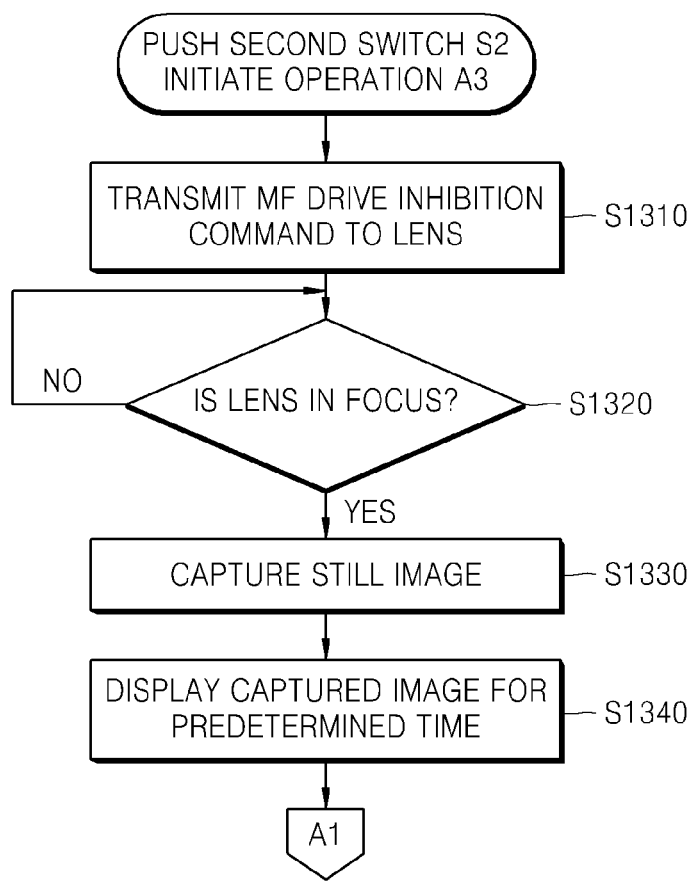
FIG. 13 is a flowchart of operation of a digital imaging apparatus when a second switch is turned on, according to another exemplary embodiment of the invention.

FIG. 13 is a flowchart of operation of a digital imaging apparatus when a switch S2 is pushed, according to another exemplary embodiment of the invention.

Referring to FIG. 13, the second switch S2 may be pushed to perform operation A3. When the second switch S2 is pushed, a MF drive inhibition command may be transmitted (S1310). Afterwards, it may be determined whether the lens is in focus (S1320). When the lens is in focus, a still image may be captured (S1330), and the captured still image may be displayed for a predetermined time (S1340).

Figure 14:
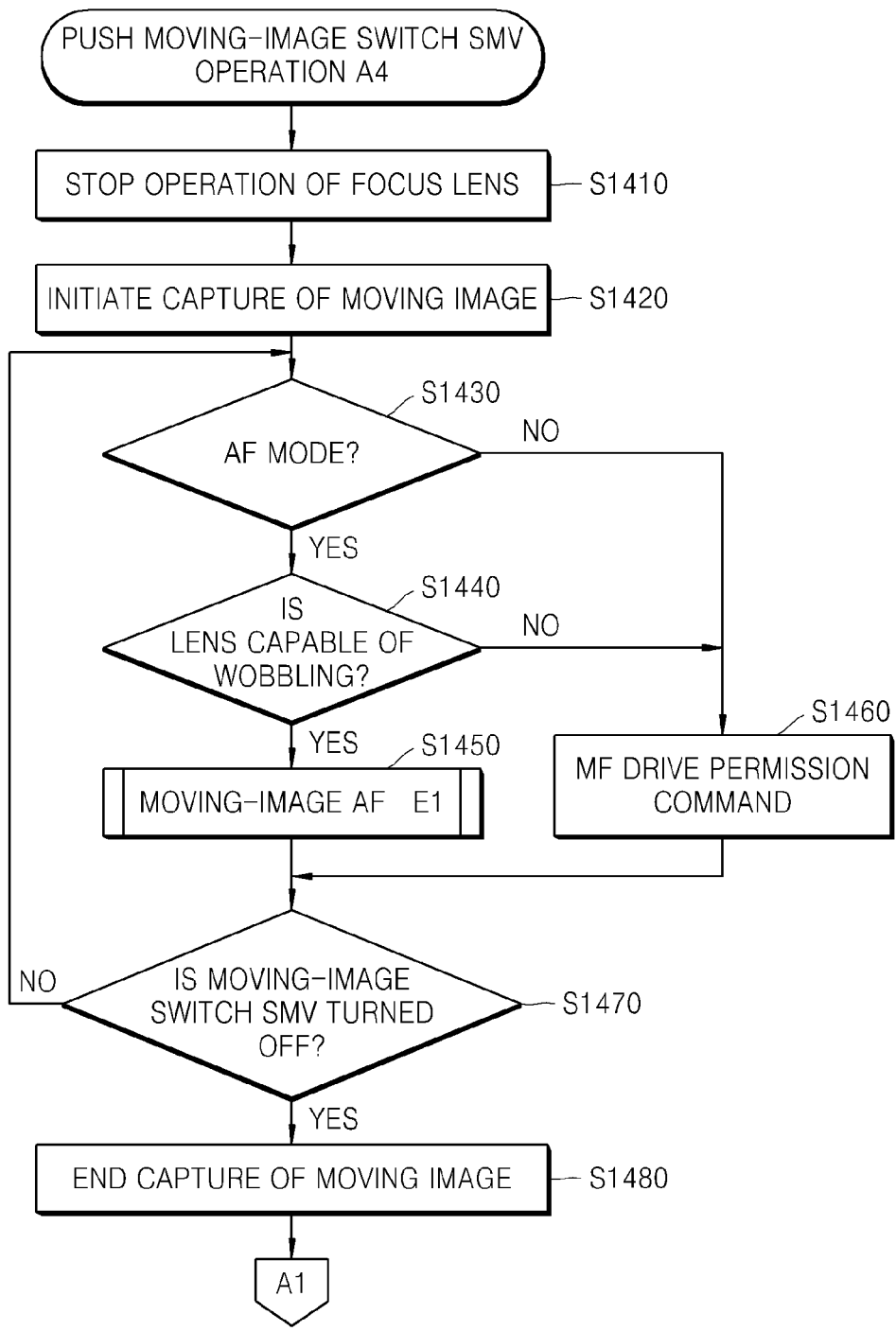
FIG. 14 is a flowchart of operation of a digital imaging apparatus when a moving-image switch is turned on, according to an exemplary embodiment of the invention.

FIG. 14 is a flowchart of operation of a digital imaging apparatus when a moving-image switch SMV is pushed, according to an exemplary embodiment of the invention.

Referring to FIG. 14, the moving-image switch SMV may be pushed to perform operation A4. When the moving switch SMV is turned on, the moving image may be captured. To begin with, a focus-lens drive stop command may be transmitted to the lens (S1410). When the capture of the moving image is initiated, the previously performed AF operation may be stopped.

Afterwards, the capture of the moving image may be initiated (S1420). The capture of the moving image may be continued until the moving-image switch SMV is pushed again and turned off. After that, it may be determined whether an AF mode is selected (S1430). When the AF mode is not selected, the process may enter operation S1460. Otherwise, when the AF mode is selected, it may be determined whether the interchangeable lens is capable of wobbling based on lens information (S1440). When the interchangeable lens is capable of wobbling, an AF operation for a moving image may be performed (S1450). A description of the AF operation for the moving image will be understood with reference to FIGS. 17A and 17B. Otherwise, when the interchangeable lens is incapable of wobbling, the AF operation for the moving image may not be performed during the capture of the moving image, and a MF drive permission command may be transmitted to the lens (S1460). When it is necessary to change a focal position during the capture of the moving image, a user may confirm a time point during a MF operation and control the focal position. The MF operation may be useful especially when the AF operation is not performed.

Afterwards, it may be determined whether the moving-image switch SMV is turned off. When the moving-image switch SMV is turned off, the capture of the moving image may be ended (S1470). Otherwise, when the moving-image switch SMV is not turned off, the process may enter operation S1430, and the capture of the moving image may be continued. Although not shown in FIG. 14, AE and AWB operations may be performed and a live-view display operation may be repeated during the capture of the moving image.

Figure 15:
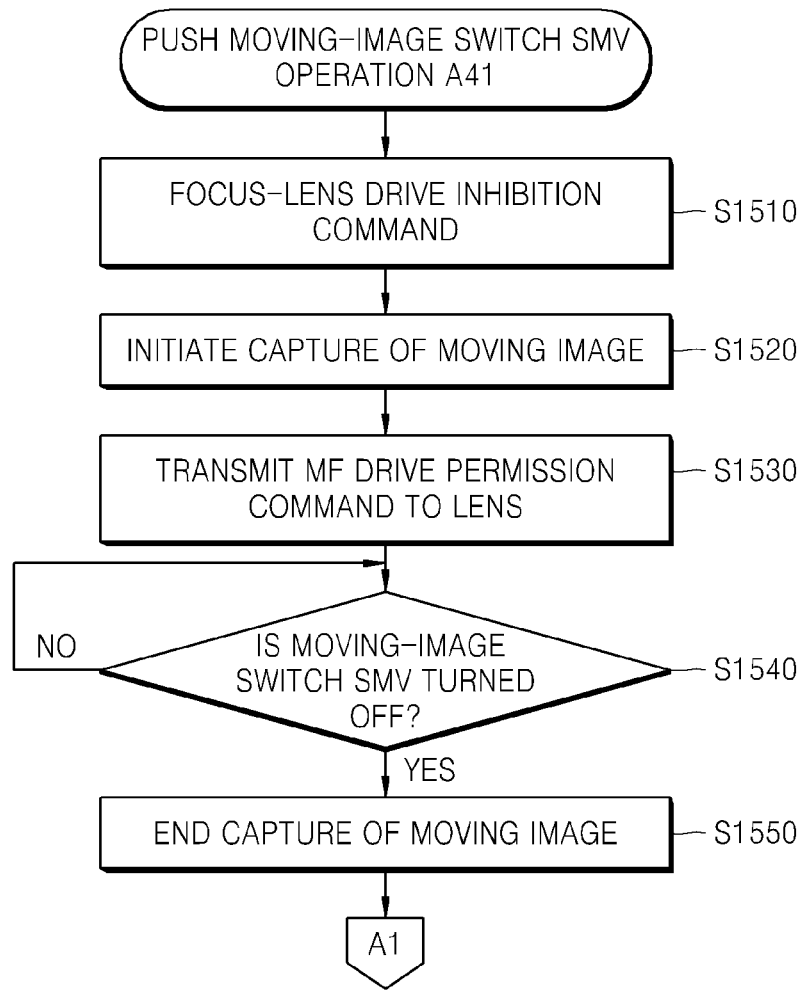
FIG. 15 is a flowchart of operation of a digital imaging apparatus when a moving-image switch is turned on, according to another exemplary embodiment of the invention.

FIG. 15 is a flowchart of operation of a digital imaging apparatus when a moving-image switch SMV is pushed, according to another exemplary embodiment of the invention. FIG. 15 illustrates an example case where capture of a moving image is performed prior to an AF operation.

When operation A41 is performed by pushing the moving-image switch SMV, even if the AF operation is not finished, operation of the focus lens may be stopped (S1510), and the capture of the moving image may be initiated (S1520). When the capture of the moving image is initiated, a MF drive permission command may be transmitted to the lens, and the moving image may be captured until the moving-image switch SMV is pushed again and turned off (S1530~S1550).

Figure 16:
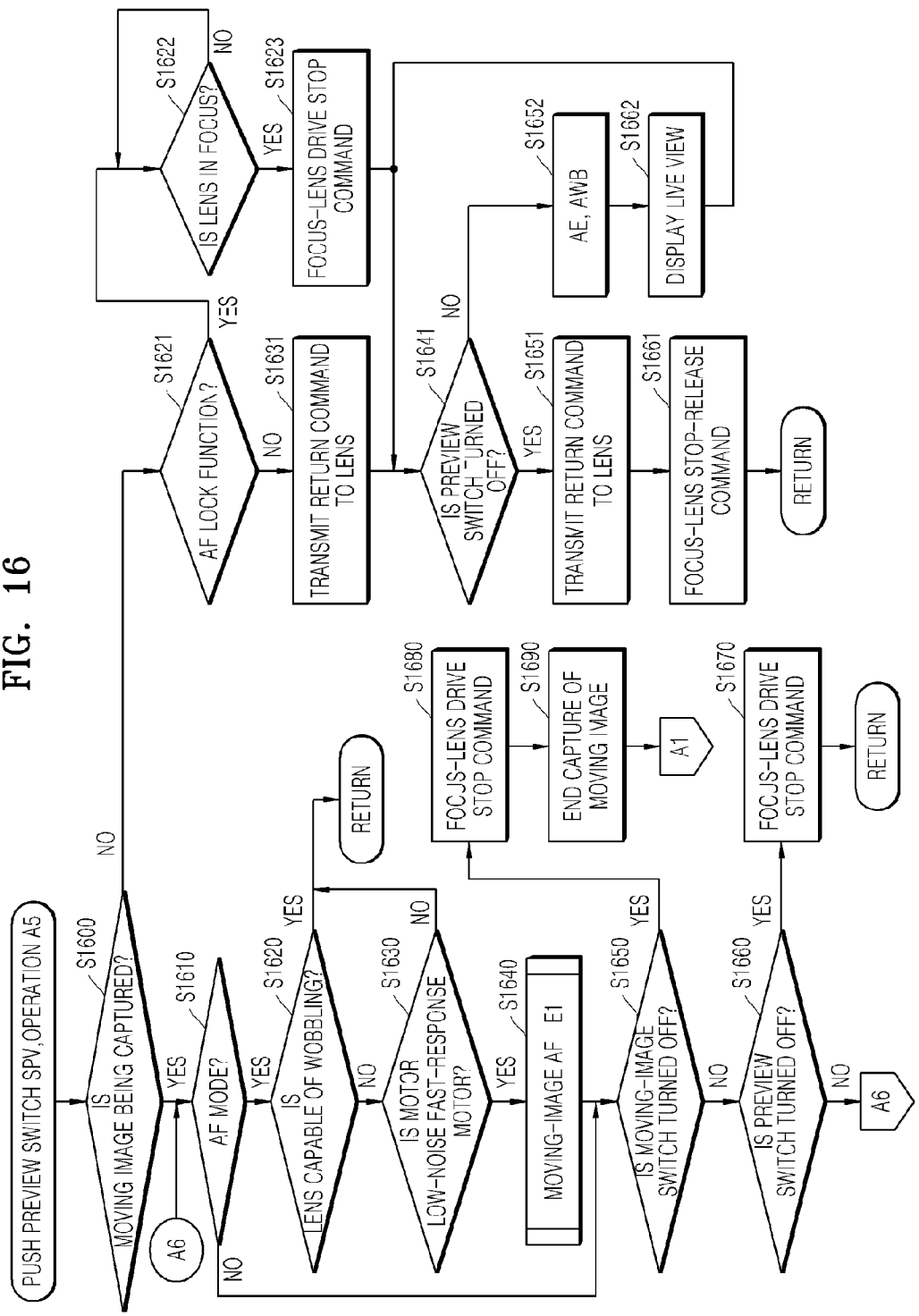
FIG. 16 is a flowchart of operation of a digital imaging apparatus when a preview switch is turned on during capture of a moving image, according to an exemplary embodiment of the invention.

FIG. 16 is a flowchart of operation of a digital imaging apparatus when a preview switch SPV is pushed during capture of a moving image, according to an exemplary embodiment of the invention.

Operation of the preview switch SPV according to three embodiments will now be described. When a moving-image switch SMV and the preview switch SPV are turned on, an AF operation may be performed in a moving image mode. When the moving-image switch SMV is not turned on and the preview switch SPV is pushed, the digital imaging apparatus may perform an AF lock function or preview function. However, it should be noted that this description may be applied only to a digital imaging apparatus using a preview switch SPV according to embodiments and various other changes may be made.

It may be determined whether the moving image is being captured (S1600). When the moving image is not being captured, the process may enter operation S1621. During non-capture of the moving image, the preview switch SPV may perform a preview function or an AF lock function in a still image mode (S1610 and S1621). The function of the preview switch SPV may be set beforehand by controlling menus when a mode is determined in operation A1 of FIG. 10.

During the non-capture of the moving image, the process may enter operation S1621 so that it may be determined whether the lens is in focus (S1622). When the lens is out of focus, the digital imaging apparatus may wait until the lens is focused, and a focus-lens drive stop command may be then transmitted to the lens (S1623). The above-described function may be useful during a continuous AF operation.

That is, an AF may be fixed by turning on the preview switch SPV during the continuous AF operation. Afterwards, it may be determined whether the preview switch SPV is pushed again and turned off (S1641). When the preview switch SPV is turned off, a return command may be transmitted to the lens (S1651), and a stop release command may be transmitted to a focus lens (S1661). Otherwise, when the preview switch SPV remains turned on, AE and AWB operations (S1652) and a live-view display operation (S1662) may be repeated until the preview switch SPV is turned off. Also, operation S1651 may be performed during a preview operation. Thus, the return command may be an ineffective command because the focus-lens drive stop command is not transmitted during the current operation.

When the preview switch SPV performs the preview function in operation S1621, the lens return command may be transmitted to an interchangeable lens to return the interchangeable lens (S1631) to its original position. Afterwards, it may be determined whether the preview switch SPV is pushed again and turned off (S1641). When the preview switch SPV remains turned on, the AE and AWB operations (S1652) and the live-view display operation (S1662) may be repeated until the preview switch SPV is turned off. Due to the live-view display operation, the depth of field of the subject may be confirmed.

When the preview switch SPV is pushed again and turned off (S1641), a lens return command may be transmitted to the lens (S1651), and a stop release command may be transmitted to the focus lens, so that an interruption operation may be ended. Operation S1661 may be performed during the AF lock function. Thus, the stop release command may be an ineffective command because the focus-lens drive stop command is not transmitted during the current operation.

Thereafter, when the preview switch SPV is pushed during the capture of the moving image (S1600), it may be determined whether an AF mode is selected (S1610). When the AF mode is not selected, the process may enter operation S1650. Otherwise, when the AF mode is selected, it may be determined whether the interchangeable lens is capable of wobbling (S1620).

When the interchangeable lens is incapable of wobbling, since a moving-image AF operation is initiated at the same time as capture of a moving image, the process may return. Otherwise, when the interchangeable lens is capable of wobbling, it may be determined whether a motor is a low-noise fast-response motor based on the lens information (S1630). When the motor is not a low-noise fast-response motor, the AF operation may not be performed during the capture of the moving image and the process may return. Otherwise, when the motor is a low-noise fast-response motor, the moving-image AF operation may be performed (S1640). The moving-image AF operation may be understood with reference to the moving-image AF operation (or operation E1) of FIGS. 17A and 17B.

Afterwards, it may be determined whether the moving-image switch SMV is turned off (S1650). When the moving-image switch SMV is turned off, a focus-lens drive stop command may be transmitted to the lens (S1680), and the capture of the moving image may be ended (S1690). After that, the process may return to operation A1 of FIG. 10 to perform a live-view display operation.

Otherwise, when the moving-image switch SMV is turned on, it may be determined whether the preview switch SPV is turned off (S1660). When the preview switch SPV is turned off, a focus lens drive stop command may be transmitted to the lens (S1670). Otherwise, when the preview switch SPV is still turned on, the process may return to operation A6 to continuously perform a continuous AF operation.

Figure 17A:
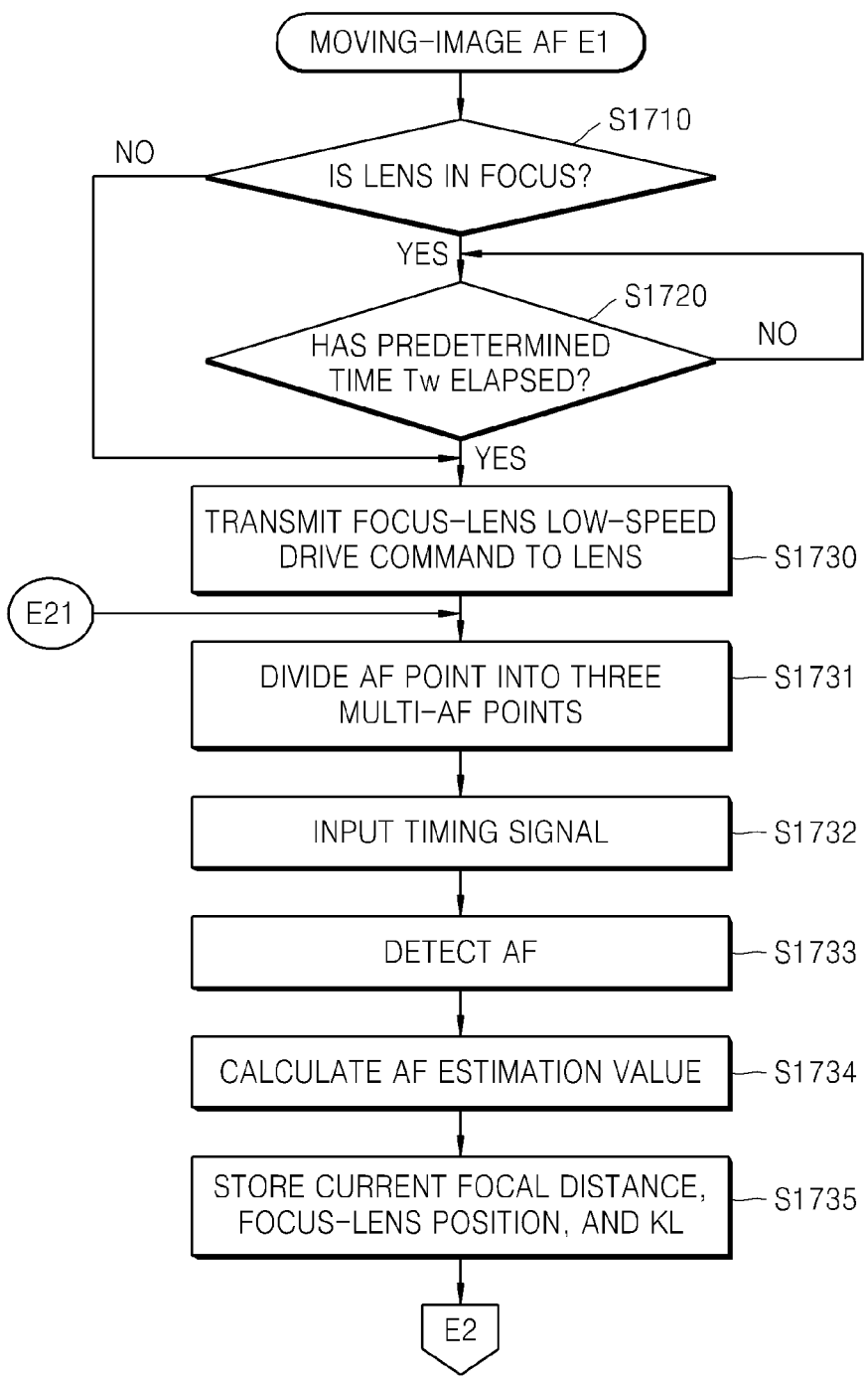
FIGS. 17A and 17B are flowcharts of a moving-image auto-focus (AF) operation according to an exemplary embodiment of the invention.
Figure 17B:
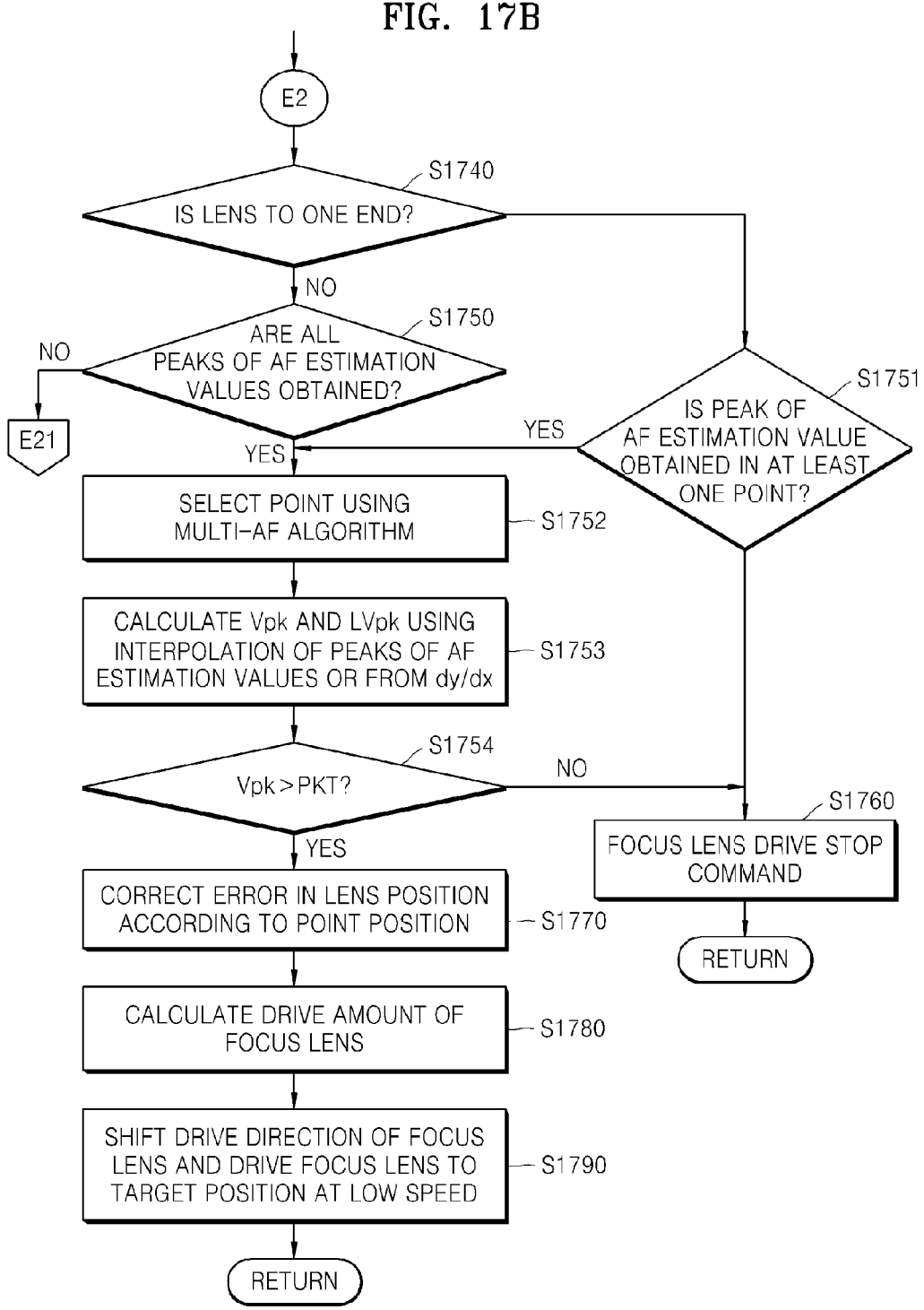

FIGS. 17A and 17B are flowcharts of a moving-image AF operation according to an exemplary embodiment of the invention. A continuous AF operation may be performed during capture of moving images.

Initially, it may be determined whether the lens is in focus (S1710). When the lens is in focus, an AF operation may be performed in a predetermined time Tw. To enable a gentle continuous AF operation, the AF operation may be performed after a digital imaging apparatus waits for the predetermined time Tw since the lens is focused. When the lens is out of focus, the digital imaging apparatus may not wait for the predetermined time Tw.

The predetermined time Tw may be, for example, 500 ms or 1 sec. Even the lens incapable of wobbling may wait for the predetermined time Tw. However, the lens capable of wobbling may omit operation S1720.

Afterwards, a focus lens low-speed drive command may be transmitted to the lens. The lens control circuit 110 may drive the lens at a lower constant speed than in a typical AF operation to perform a contrast AF operation during the capture of moving images. A lens capable of wobbling may be basically set in a low-speed drive state. Referring to FIG. 4, it may be seen that a wobbling rate of the lens may not be constant but have a waveform, for example, a sine curve.

Subsequently, an AF point may be divided into three multi-AF points (S1731). Each of the divided multi-AF points used during the capture of the moving image may have a greater size than each of the 15 multi-AF points used during the capture of the still image. Although a moving image mode and a still image mode differ in the size of divided multi-AF points, the AF point may be the same before the focus detection operation. After that, appropriate imaging timing signals may be applied to the three multi-AF points (S1732). The imaging timing signals may be generated according to the focus detection points to initiate an AF detection operation.

After the imaging timing signals are applied, image signals of the AF point may be applied to an AF detection circuit of the pre-processor 220 to perform the AF detection operation (S1733), and AF estimation values L16 to L18 of the three respective multi-AF points may be calculated (S1734).

By calculating the AF estimation values, a current focal distance from the interchangeable lens 100, a position of the focus lens 104 at an AF detection time point, and the current drive amount and a conversion coefficient KL of a focal deviation of the focus lens 104 may be obtained. A set of the KL value and the AF estimation value may be stored (S1735).

It may be determined whether the focus lens 104 is driven to one end (S1740). When the focus lens 104 is not driven to one end, it may be determined whether all peaks of the AF estimation values L16 to L18 are obtained (S1750). When all the peaks of the AF estimation values L16 to L18 are not obtained, the process may return to operation S1731.

Meanwhile, there may be cases where the focus lens 104 may be driven to one end during the AF operation before all the peaks of multi-AF points are calculated. In these cases, the process may skip to operation S1751 to determine whether a peak of an AF estimation value is obtained in at least one point of the multi-AF points (S1751). When the peak of the AF estimation value is obtained at even one point, the process may enter operation S1752.

On the other hand, when there is no point where a peak of an AF estimation value is obtained, it may be determined that AF control has failed. Thus, a command to stop the drive of the focus lens 104 may be transmitted to the interchangeable lens 100 (S1760). Afterwards, the process may return to repeat the AF operation.

When a peak in a contrast AF is obtained, a subject may be determined according to a multi-AF algorithm using the AF estimation values calculated in operation S1752. Here, any one of a method of applying the multi-AF algorithm to all the three multi-AF points or a method of applying the multi-AF algorithm to only a peak detection point of the three multi-AF points may be adopted. In general, a point including a peak position is closest to a camera may be selected.

When one of the multi-AF points is selected according to the multi-AF algorithm, a peak Vpk of an AF estimation value and a focus-lens position LVpk at a position where the peak Vpk is obtained may be calculated at the selected point using interpolation calculation (S1753). A lens capable of wobbling may obtain a point where differential components dy/dx reach zero (0) as a peak position.

A point 420 where the differential components (dy/dx) reach zero (0) is obtained as a peak. Thus, the focus of the focus lens may be detected.

It may be determined whether the calculated peak Vpk is greater than a reference value PKT (S1754). When the peak Vpk is greater than the reference value PKT, it may be determined that AF control is possible. Also, a correction coefficient required for a correction operation may be received from the interchangeable lens 100 to correct an error in lens position according to the position of a selected point (S1770).

The error in lens position may occur due to a difference between an imaging lens and an AF detection frequency. Also, the error in lens position may vary according to the position of a focus detection point. Thus, the error in lens position may be corrected in consideration of an errorΔIB caused by the difference between the imaging lens and the AF detection frequency and an error ΔIBoff varying according to the position of the focus detection point. Here, the error ΔIBoff may be previously determined according to a selected focus detection point.

Since the lens position may be corrected in terms of um, the lens position may be converted into the drive amount of the focus lens (S1780). The drive amount of the focus lens may be calculated by ΔLVpk×KL. A value obtained at a point closest to the focus-lens position LVpk may be used as a conversion coefficient KL of a focal deviation.

Afterwards, a focus-lens drive direction shift command may be transmitted to the interchangeable lens, and a focus-lens low-speed-drive command may be transmitted to a target position. In the case of a lens capable of wobbling, since a focus lens is already positioned near the target position, the commands may have already been transmitted. After that, the process may be return to a moving-image AF operation (or operation E1) and operation E1 may be ended.

Embodiment 1

Lens Sequence

Figure 18:
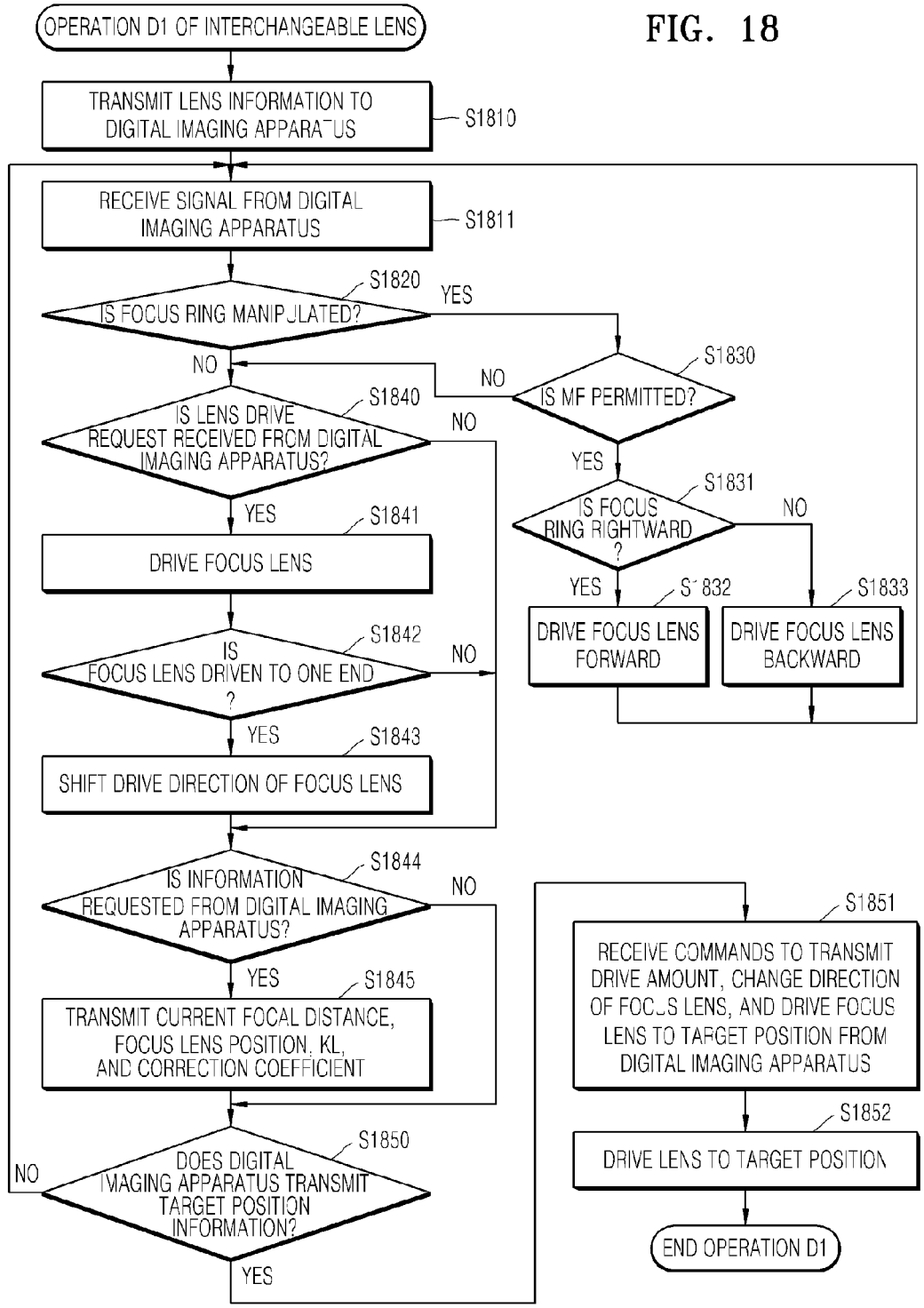
FIG. 18 is a flowchart of operation of a digital imaging apparatus having an interchangeable lens, according to an exemplary embodiment of the invention.

FIG. 18 is a flowchart of operation of an interchangeable lens of a digital imaging apparatus, according to an exemplary embodiment of the invention.

When the digital imaging apparatus is driven, operation D1 of an interchangeable lens may be initiated. Lens information may be transmitted to the digital imaging apparatus (S1810). The lens information may include intrinsic parameters stored in the lens memory (refer to 112 in FIG. 1) to enable AF, AE, AWB, and resolution control operations. The lens information may include information about whether wobbling is possible and information regarding an AF drive actuator. An actuator used for the interchangeable lens may be a stepping motor, a VCM, an annular ultrasonic motor, a cylindrical ultrasonic motor, or an impact piezoelectric motor.

A focus-lens drive request signal may be removed from the digital imaging apparatus. The focus-lens drive request signal may include information about whether a MF operation is permitted and focus-lens drive information required for an AF operation. It may be determined whether a focus ring of the interchangeable lens is manipulated (S1820).

When the focus ring is manipulated, a pulse signal may be generated. When the pulse signal is generated, it may be determined whether the MF operation is permitted (S1830). When the MF operation is permitted, it may be determined whether the focus ring is manipulated clockwise or counter-clockwise (S1831). When the focus ring is manipulated rightward, the focus lens may be driven forward according to the generated pulse signal (S1832). Otherwise, when the focus ring is manipulated leftward, the focus lens may be driven backward according to the generated pulse signal (S1833). Subsequently, the process may return to operation D2.

Otherwise, when the focus ring is not manipulated or the MF operation is not permitted, it may be determined whether a lens drive request is received from the digital imaging apparatus to perform the AF operation (S1840). When no lens drive request is received (S1840), the process may skip to operation S1844.

Otherwise, when the lens drive request is received, operation of the focus lens may be initiated (S1841). It may be determined whether the focus lens is driven to one end (S1842). When the focus lens is driven to one end, a direction in which the focus lens is driven may be changed (S1843). Otherwise, when the focus lens is not driven to one end, the process may skip to operation S1844.

After the direction in which the focus lens is driven is changed, it may be determined whether information is requested from the digital imaging apparatus (S1844). When the information is requested, a current focal distance, a position of the focus lens, a conversion coefficient KL, an error ΔIB caused by the difference between the interchangeable lens and the AF detection frequency, and an error ΔIBoff varying according to the position of a focus detection point may be transmitted to the digital imaging apparatus (S1845). Otherwise, when the information is not requested, the process may skip to operation S1850.

Subsequently, it may be determined whether the digital imaging apparatus transmits target position information (S1850). When the digital imaging apparatus does not transmit the target position information, the process may return to operation S1811. Otherwise, when the digital imaging apparatus transmits the target position information, commands to transmit a drive amount, change the direction of the focus lens, and drive the focus lens to a target position may be received from the digital imaging apparatus (S1851). Subsequently, the focus lens may be driven to the target position (S1852), and operation D1 may be ended.

Embodiment 2

Figure 5:
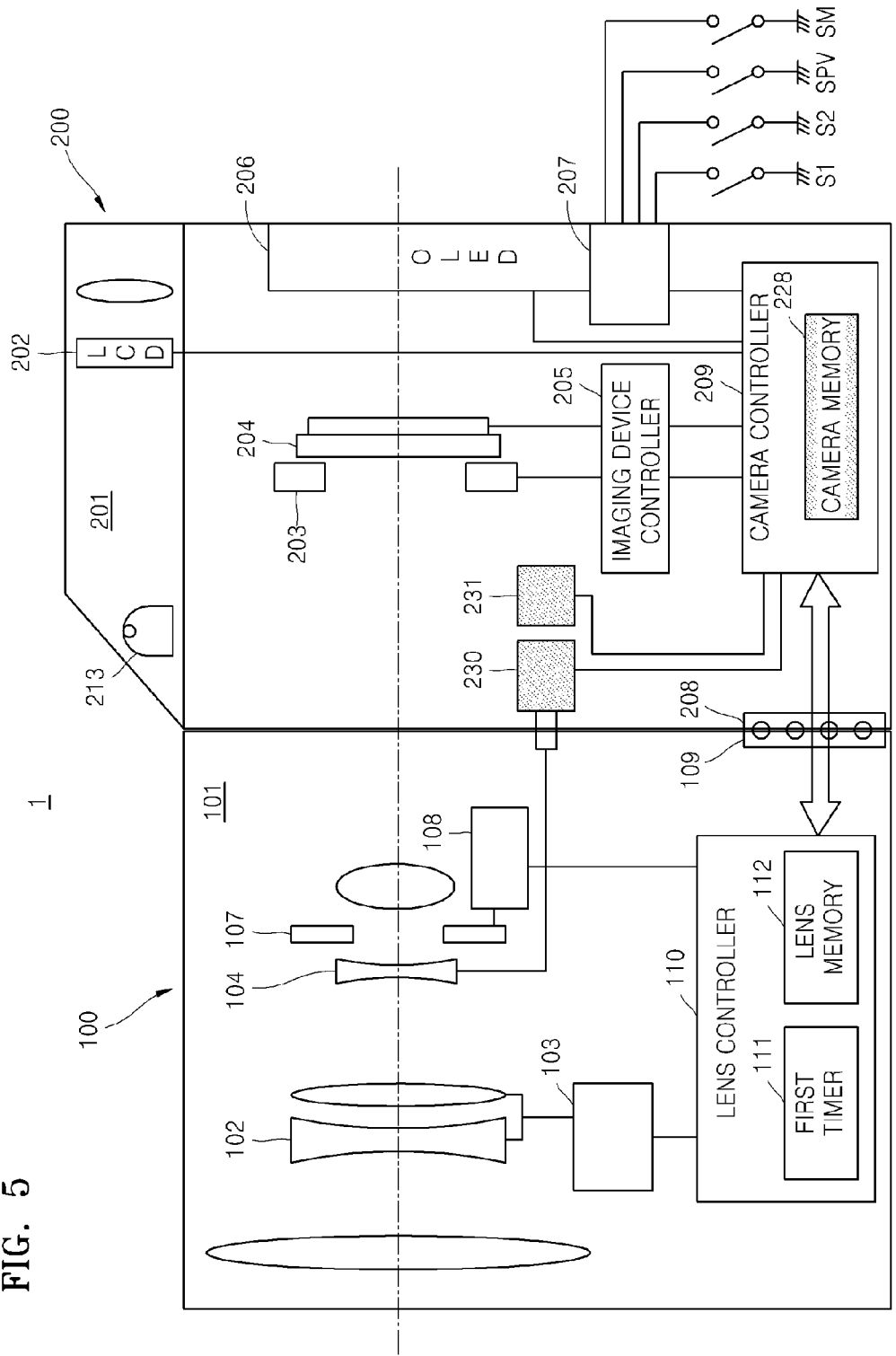
FIG. 5 is a diagram of a digital imaging apparatus having an interchangeable lens, according to another exemplary embodiment of the invention.

FIG. 5 is a diagram of a digital imaging apparatus 1 using an interchangeable lens 100, according to another exemplary embodiment of the invention.

The digital imaging apparatus 1 of FIG. 1 includes a focus-lens actuator provided in a lens, while the digital imaging apparatus 1 of FIG. 5 includes a focus-lens actuator provided in a camera body 200 of the digital imaging apparatus 1. In the digital imaging apparatus 1 of FIG. 5, lens information may be stored in the camera body 200. Thus, when the interchangeable lens 100 is not a new lens but an old-fashioned lens that is deficient in lens information, the lens information stored in the camera body 200 may be used.

A manipulator 207 used for the digital imaging apparatus 1 of FIG. 5 may include a half-shutter switch S1, a full-shutter switch S2, a main switch SM, and a preview switch SPV. The preview switch SPV may be used as a preview switch in a still image mode and used as an AF initiation switch in a moving image mode. In the digital imaging apparatus of FIG. 5, capture of a still image and a moving image may be initiated by turning on the full-shutter switch S2.

The lens 100 of the digital imaging apparatus 1 of FIG. 1 includes the lens drive actuator 105 and the focus-lens position sensor 106, while the lens 100 of the digital imaging apparatus 1 of FIG. 5 may not include a lens drive actuator and a focus-lens position sensor.

However, the camera body 200 of the digital imaging apparatus 1 of FIG. 5 may include a lens drive actuator 230 configured to drive a focus-lens group in an optical axial direction and a position sensor 231 configured to sense the position of the focus-lens group, and a camera controller 209 may include a camera memory 228.

The camera memory 228 of the digital imaging apparatus 1 of FIG. 5 may store intrinsic information of the lens 101 or an error ΔIB caused by a difference between the lens 101 and an AF detection frequency and a correction value ΔIBoff varying according to the position of a focus detection point. Thus, in the digital imaging apparatus 1 of FIG. 5, the lens information may be stored in the camera body 200. Accordingly, even if an old interchangeable lens is deficient in lens information, the lens information stored in the camera body 200 may be employed.

Since other components of the digital imaging apparatus 1 of FIG. 5 have substantially the same or similar functions as or to those of the digital imaging apparatus 1 of FIG. 1, the components may be understood with reference to the description of FIG. 1.

Figure 19:
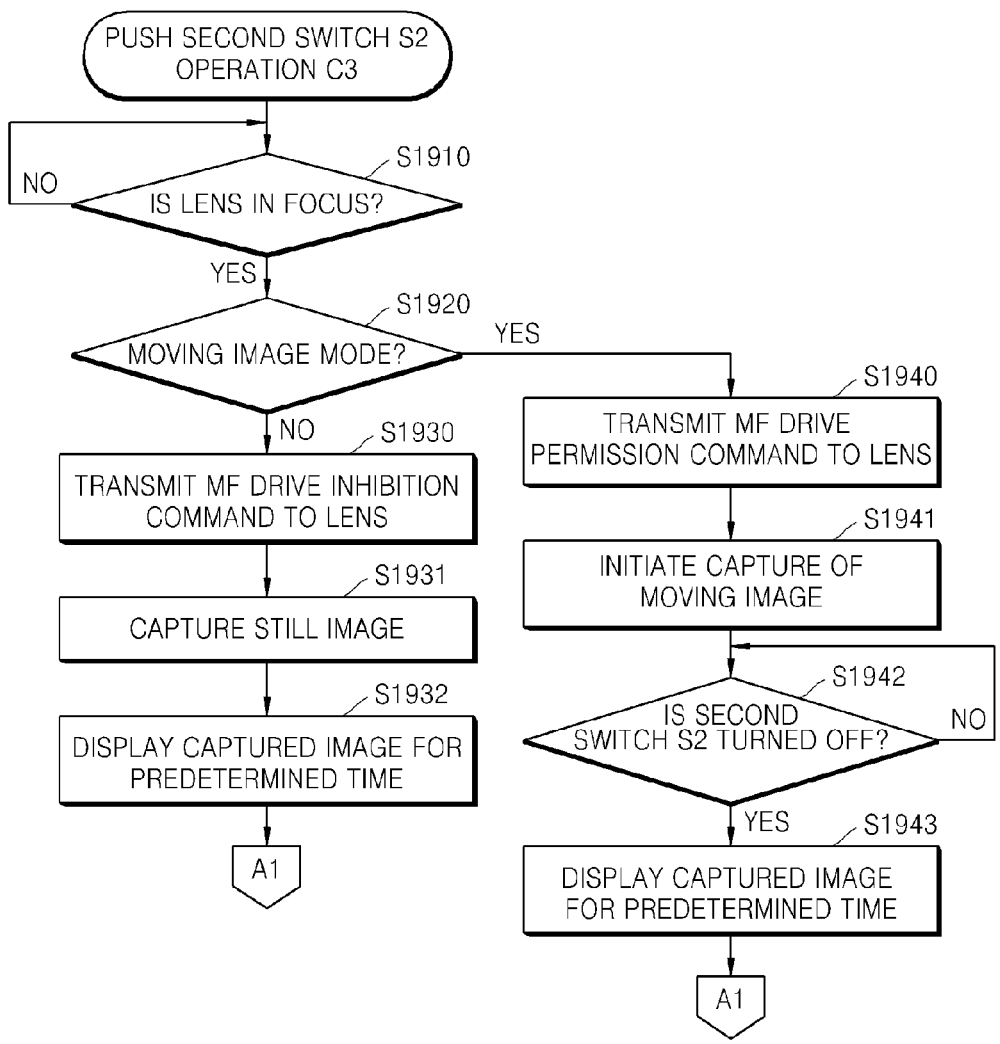
FIG. 19 is a flowchart of operation of a digital imaging apparatus having an interchangeable lens, according to another exemplary embodiment of the invention.

FIG. 19 is a flowchart of operation of a digital imaging apparatus having an interchangeable lens, according to another exemplary embodiment of the invention.

Referring to FIG. 19, in the digital imaging apparatus having an interchangeable lens, a second switch S2 may be pushed to full-push a shutter-release button. Since other operations of the digital imaging apparatus 1 having an interchangeable lens of FIG. 5 are similar to the operations described with reference to FIGS. 10 through 18, the operations may be understood with reference to the descriptions of FIGS. 10 through 18. In this case, however, commands to transmit a drive amount, change a direction in which the focus lens is driven, and drive the focus lens to a target position may not be transmitted to an interchangeable lens.

The digital imaging apparatus of FIG. 5 may convert an image capture mode into a still image mode or moving image mode using the mode dial (refer to 750 of FIG. 7) mounted outside the digital imaging apparatus.

When the second switch S2 702 is pushed, it may be determined whether a lens is in focus (S1910). That is, the digital imaging apparatus may wait until an AF operation is finished. When the lens is in focus, it may be determined whether the image capture mode is the moving image mode or still image mode (S1920). When the lens is out of focus during capture of a moving image, the digital imaging apparatus may wait until the lens is in focus, and subsequent operations may be performed.

When the image capture mode is the still image mode, a MF drive inhibition command may be transmitted to the lens (S1930). After that, a still image may be captured (S1931), and the captured image may be displayed for a predetermined time (S1932). Subsequently, the process may return to operation A1 to display a live view.

Otherwise, when the image capture mode is the moving image mode, a MF drive permission command may be transmitted to the lens (S1940). After that, capture of the moving image may be initiated (S1941), and the moving image may be captured until the second switch S2 702 is pushed again and turned off (S1942). Subsequently, the capture of the moving image may be ended (S1943), and the process may return to operation A1 to display a live view. Although not shown, AE and AWB operations and a live-view display operation may be continued even during the capture of the moving image.

Embodiment 3

Figure 6:
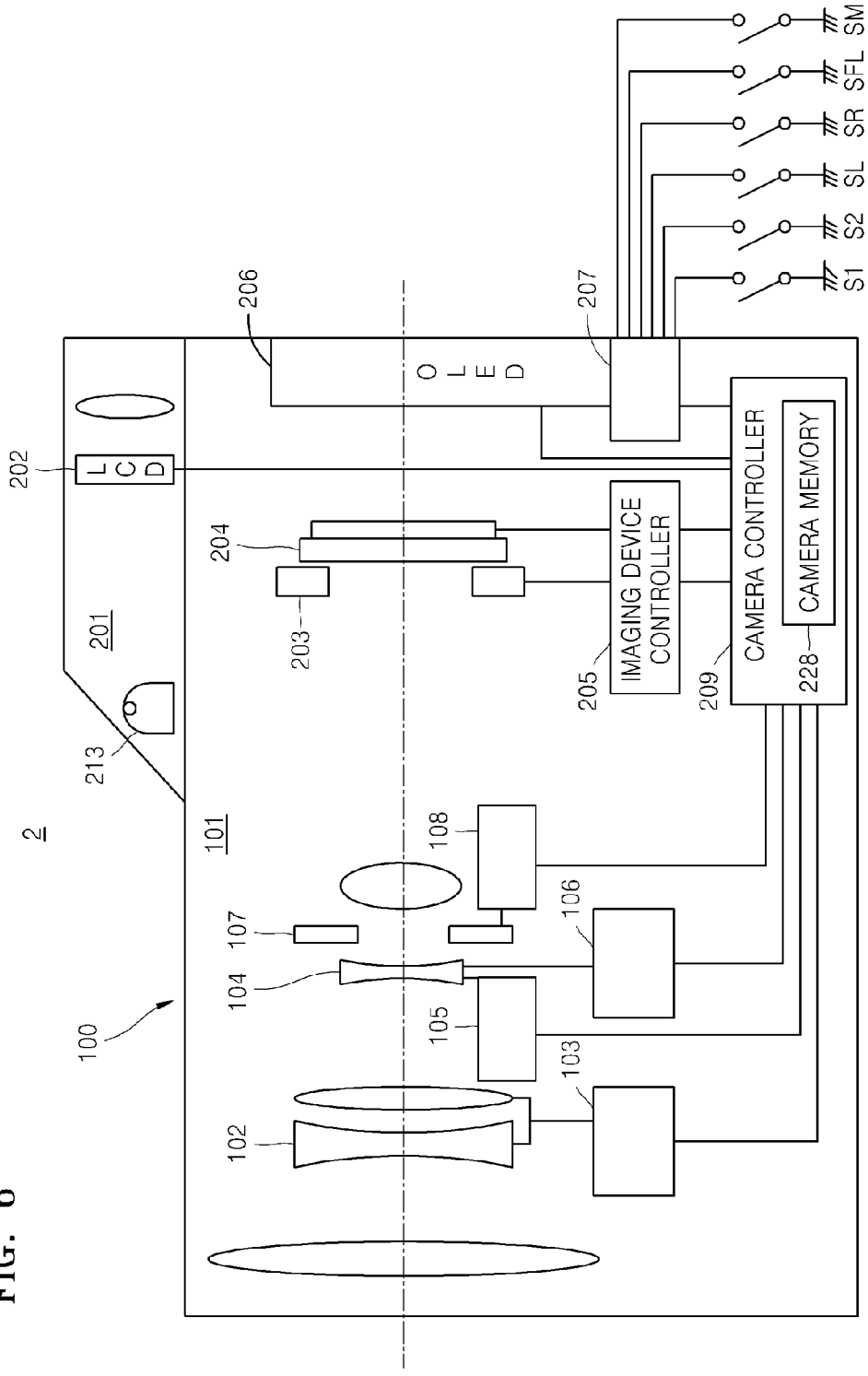
FIG. 6 is a diagram of a digital imaging apparatus in which a lens and a camera body are integrally installed, according to an exemplary embodiment of the invention.

FIG. 6 is a diagram of a digital imaging apparatus 2 in which an interchangeable lens and a camera body are integrally formed, according to an exemplary embodiment of the invention.

Since the digital imaging apparatus 2 according to the embodiment has substantially the same construction and function as the digital imaging apparatus 1 of FIG. 1, only differences therebetween will be described.

Unlike the digital imaging apparatus 1 of FIG. 1, the interchangeable lens 100 and the camera body 200 may be integrally formed in the digital imaging apparatus 2 so that the interchangeable lens 100 cannot be interchanged with other lenses. Also, since the lens 100 and the camera body 200 are integrally formed as described above, the lens mount 109 and the camera mount 208 may not be provided.

Thus, the camera controller 209 may directly control the lens drive actuator 105 and the iris drive actuator 108 and drive the zoom lens 102, the focus lens 104, and the iris diaphragm 107. Also, the camera controller 209 may directly receive positional information from the zoom lens position sensor 103 and the focus lens position sensor 106. That is, the camera controller 209 according to the embodiment may perform the same function as the lens controller 110 of FIG. 1.

The integral-type digital imaging apparatus 2 of FIG. 6 may be the same as or similar to the interchangeable-lens-type digital imaging apparatus of FIG. 5. The digital imaging apparatus 2 of FIG. 6 may differ from the digital imaging apparatus 1 of FIG. 1 in terms of a MF operation. In the digital imaging apparatus 2 of FIG. 6, MF backward and forward operations may be performed using rightward and leftward drive switches 930 and 931 instead of manipulating a manual ring. By manipulating the leftward and rightward drive switches SL 930 and SR 931, the camera controller 209 may drive the focus-lens group based on a manipulation time. During an AF operation, operations of the leftward and rightward drive switches SL 930 and SR 931 may be ineffective.

In FIG. 6, S1 denotes a switch configured to half-push a shutter-release button, S2 denotes a switch configured to full-push the shutter-release button, SL denotes a leftward switch configured to manually drive the focus lens backward, SR denotes a rightward switch configured to manually drive the focus lens forward, and SFL denotes an internal flash pop-up switch. A manipulator 207 attached to the outside of the digital imaging apparatus 2 is shown in FIG. 9.

Figure 9:
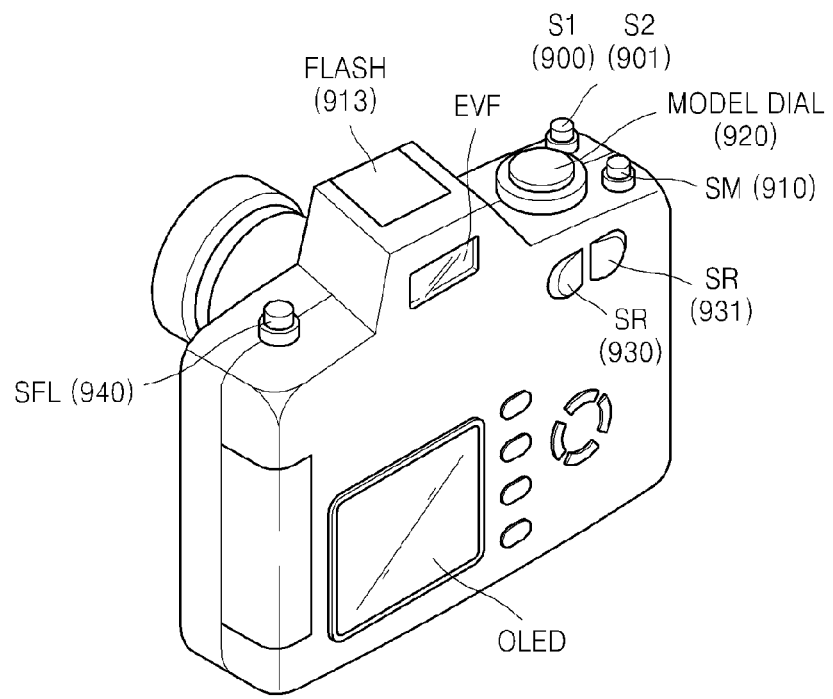
FIG. 9 is a rear view of the digital imaging apparatus as a camera, according to another exemplary embodiment of the invention.

FIG. 9 is a rear view of a digital imaging apparatus according to another exemplary embodiment of the invention, which has a rear surface the digital imaging apparatus 2 of FIG. 6 is attached.

A front view of the digital imaging apparatus is substantially the same as in FIG. 7. A first switch S1 900, a second switch S2 901, a focus-lens manual leftward drive switch SL 930, a focus-lens manual rightward drive switch SR 931, an internal pop-up flash 913, and an internal flash pop-up switch SFL 940 may be mounted on a rear surface of the digital imaging apparatus.

Since the internal pop-up flash 913 does not need to emit light during the capture of the moving image, the internal flash pop-up switch SFL 940 may function to initiate and end the AF operation during the capture of the moving image. In the digital imaging apparatus 2 of FIG. 6, capture of a still image and a moving image may be initiated by turning on the second switch S2 901. In this case, an imaging mode may be converted into a still image mode or moving image mode using the mode dial 920.

Operation of the digital imaging apparatus according to another exemplary embodiment of the invention will be described with reference to FIGS. 20 through 23.

Figure 20:
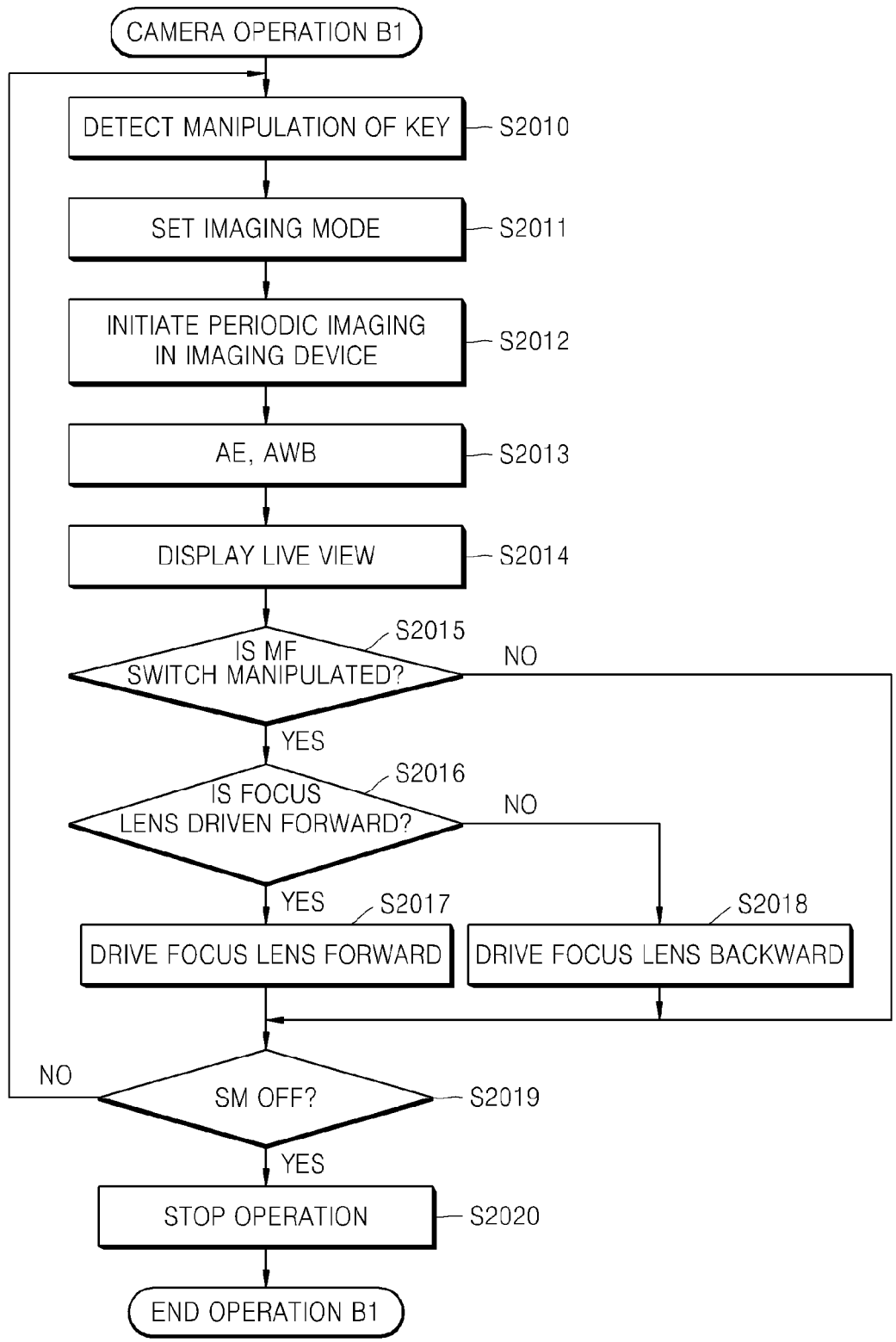
FIG. 20 is a flowchart of operation of an integral-type digital imaging apparatus according to an exemplary embodiment of the invention.

FIG. 20 is a flowchart of operation of an integral-type digital imaging apparatus according to an exemplary embodiment of the invention. When a main switch SM of the digital imaging apparatus is turned on, manipulation of keys may be detected (S2010). When the manipulation of keys is detected, an imaging mode may be set (S2011). An imaging operation may be periodically initiated in the imaging device (refer to a CIS 204 of FIG. 2) (S2012). Afterwards, operations of AE and AWB values may be performed (S2013), and a live-view display operation may be performed (S2014). Although it is described that operations S2012 through S2014 are sequentially performed, it should be noted that operations S2012 through S2014 may be performed simultaneously while inputting image information from the imaging device.

Furthermore, it may be determined whether the MF leftward and rightward switches SL and SR are manipulated (S2015). When the MF leftward switch SL (refer to 930 in FIG. 9) is manipulated, the focus lens may be driven backward (S2016, S2018). Otherwise, when the MF rightward switch SR (refer to 931 in FIG. 9) is manipulated, the focus lens may be driven forward (S2016, S2017). When the MF leftward and rightward switches SL and SR are not manipulated, the process may skip to operation S2019.

The above-described operation may be performed until the main switch SM is turned off (S2019), and the digital imaging apparatus may be stopped (S2020).

Figure 21A:
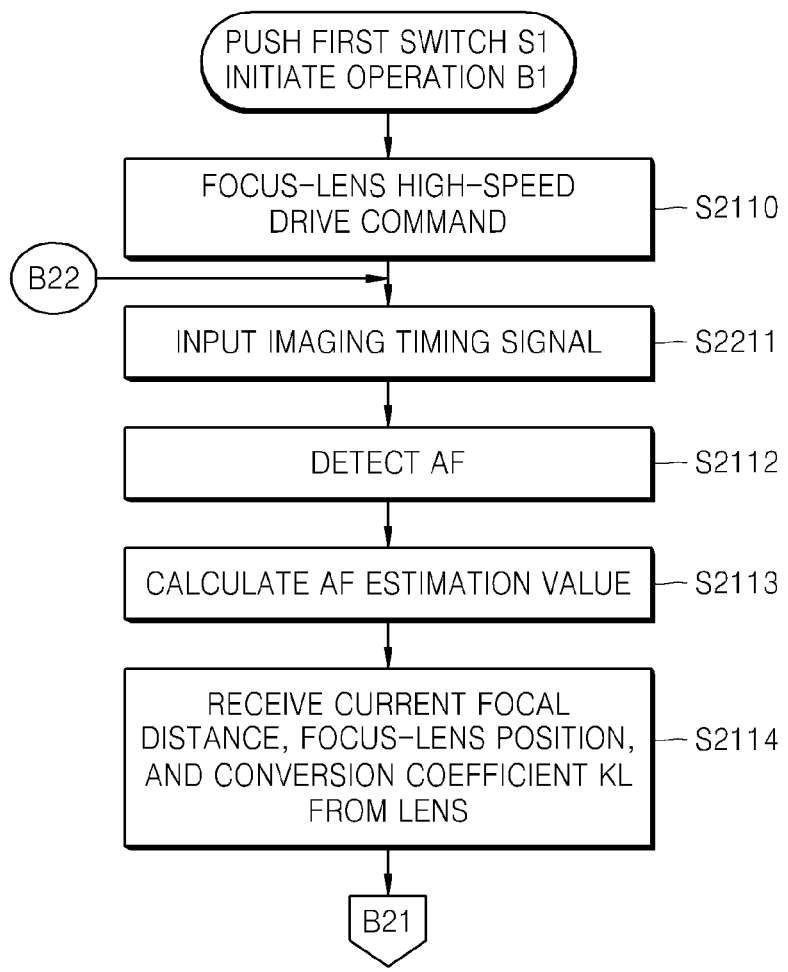
FIGS. 21A and 21B are flowcharts of operation of a digital imaging apparatus when a half-shutter switch S1 is turned on, according to another exemplary embodiment of the invention.
Figure 21B:
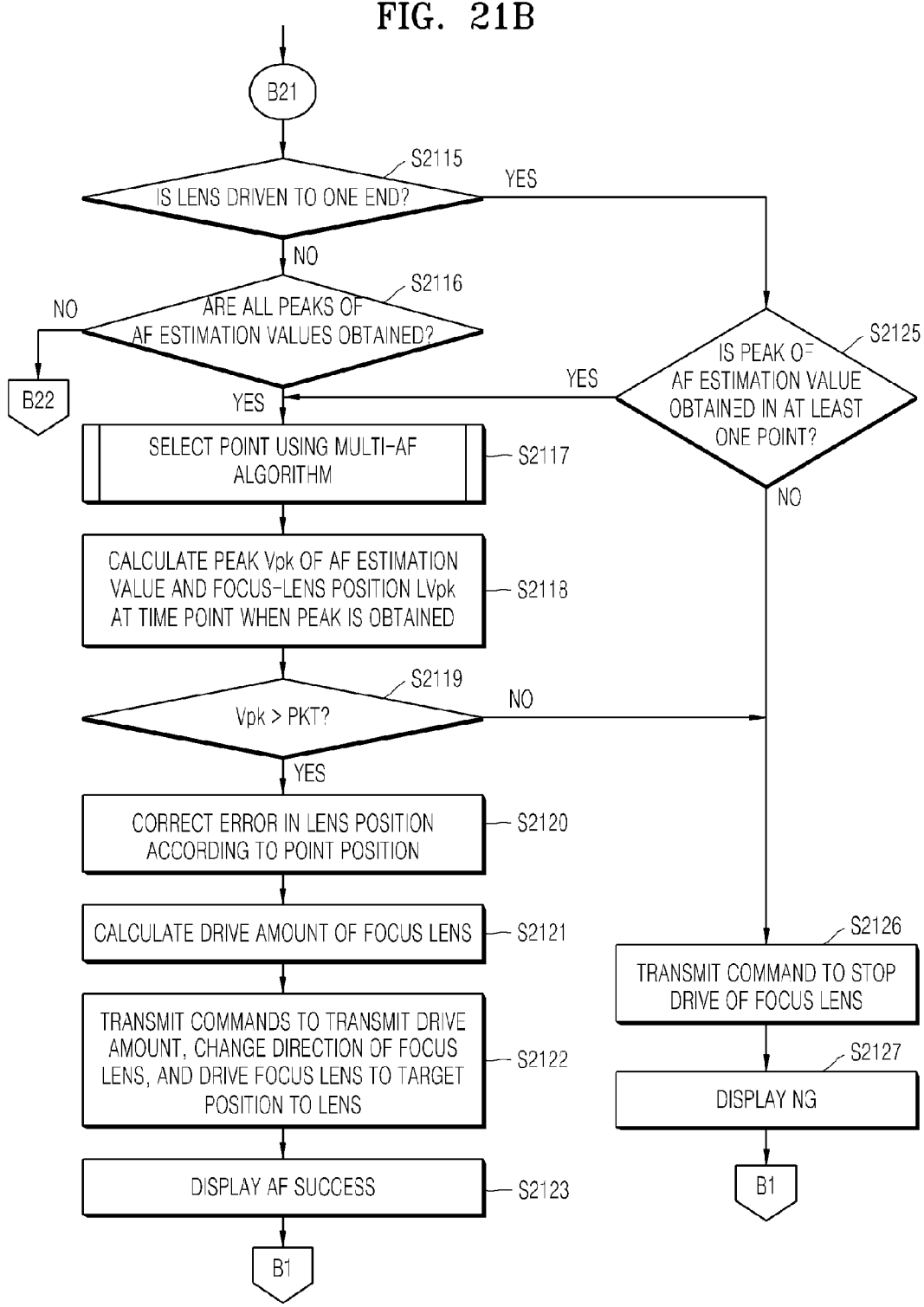

FIGS. 21A and 21B are flowcharts of operation of a digital imaging apparatus when a switch S1 is turned on, according to another exemplary embodiment of the invention.

Since the operation of FIGS. 21A and 21B is substantially the same as the operations of FIGS. 12A and 12B except that a control command is transmitted to a focus lens and a continuous AF operation is omitted, a description thereof will be omitted.

Figure 22:
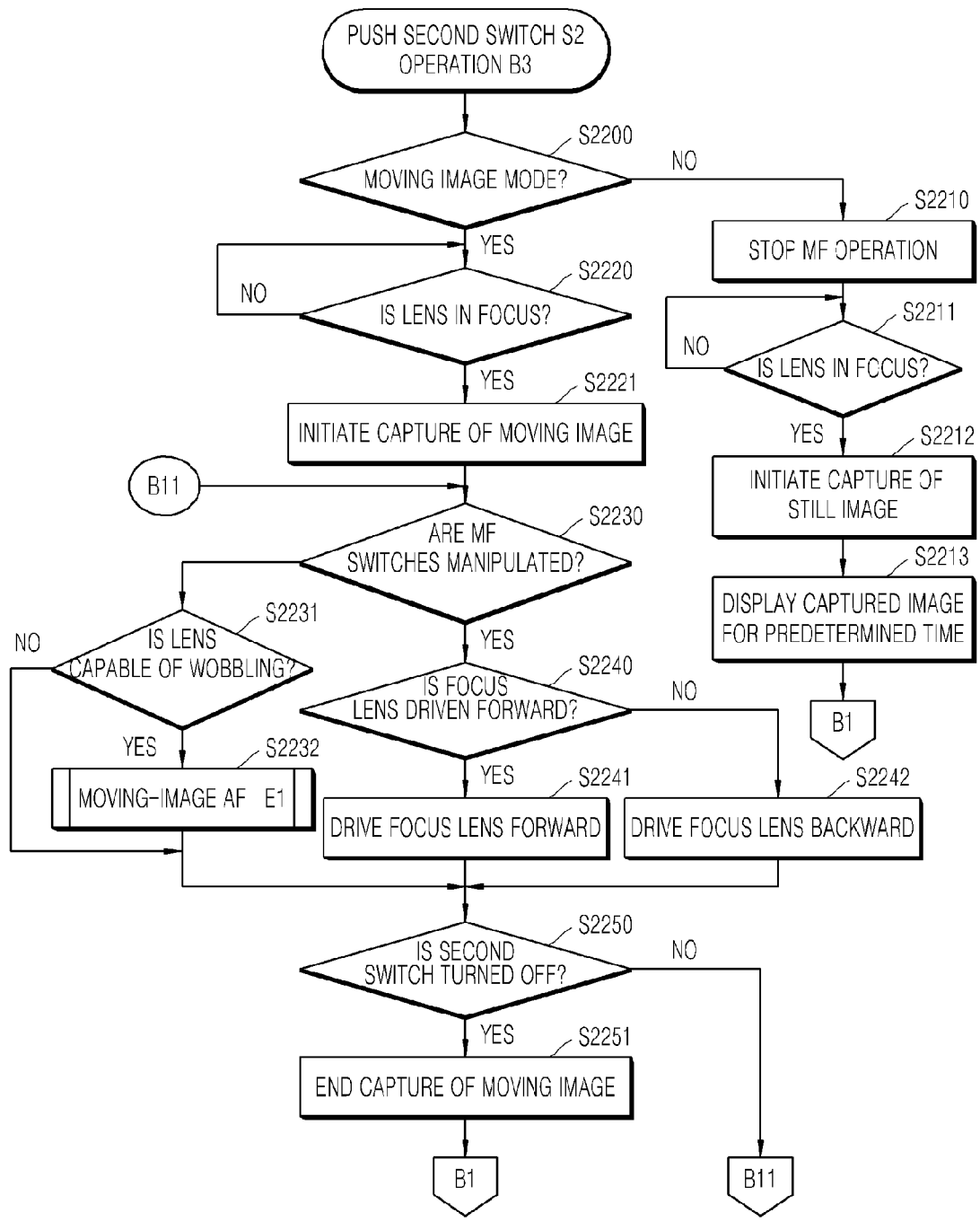
FIG. 22 is a flowchart of operation of a digital imaging apparatus when a full-shutter switch S2 is turned on, according to another exemplary embodiment of the invention.

FIG. 22 is a flowchart of operation of a digital imaging apparatus when a switch S2 is turned on, according to another exemplary embodiment of the invention.

When the switch S2 is pushed, it may be determined whether an image capture mode is a moving image mode or still image mode (S2200). When the image capture mode is the still image mode, the digital imaging apparatus may transmit a MF drive inhibition command to a lens (S2210). When the lens is out of focus, the digital imaging apparatus may wait until the lens is in focus, and undergo subsequent operations (S2211). Afterwards, a still image may be captured (S2212), and the captured image may be displayed for a predetermined time (S2213). Subsequently, the process may return to operation B1 and the digital imaging apparatus may display a live view.

When the image capture mode is the moving image mode, the digital imaging apparatus may wait until the lens is in focus, and undergo subsequent operations (S2220). The digital imaging apparatus may start capturing a moving image (S2221). Also, it may be determined whether MF leftward and rightward switches SL and SR are manipulated (S2230). When the MF rightward switch SR (refer to 931 in FIG. 9) is manipulated (S2440), the focus lens may be driven forward (S2241). When the MF leftward switch SL (refer to 930 in FIG. 9) is manipulated (S2440), the focus lens may be driven backward (S2242). The above-described operation may be performed until the second switch S2 is pushed again and turned off (S2250), and the capture of the moving image may be ended (S2251).

Otherwise, when the MF leftward and rightward switches SL and SR are not manipulated (S2230), operation S2231 may be performed to determine whether the lens is capable of wobbling. When the lens is capable of wobbling S2232, a moving-image AF operation (operation E1) may be performed. Otherwise, when the lens is incapable of wobbling, the moving-image AF operation may not be performed, and the capture of the moving image may be performed until the switch S2 is pushed again and turned off (S2250, S2251). When the capture of the moving image is ended (S2251), the process may return to operation B1 to display a live view.

Figure 23:
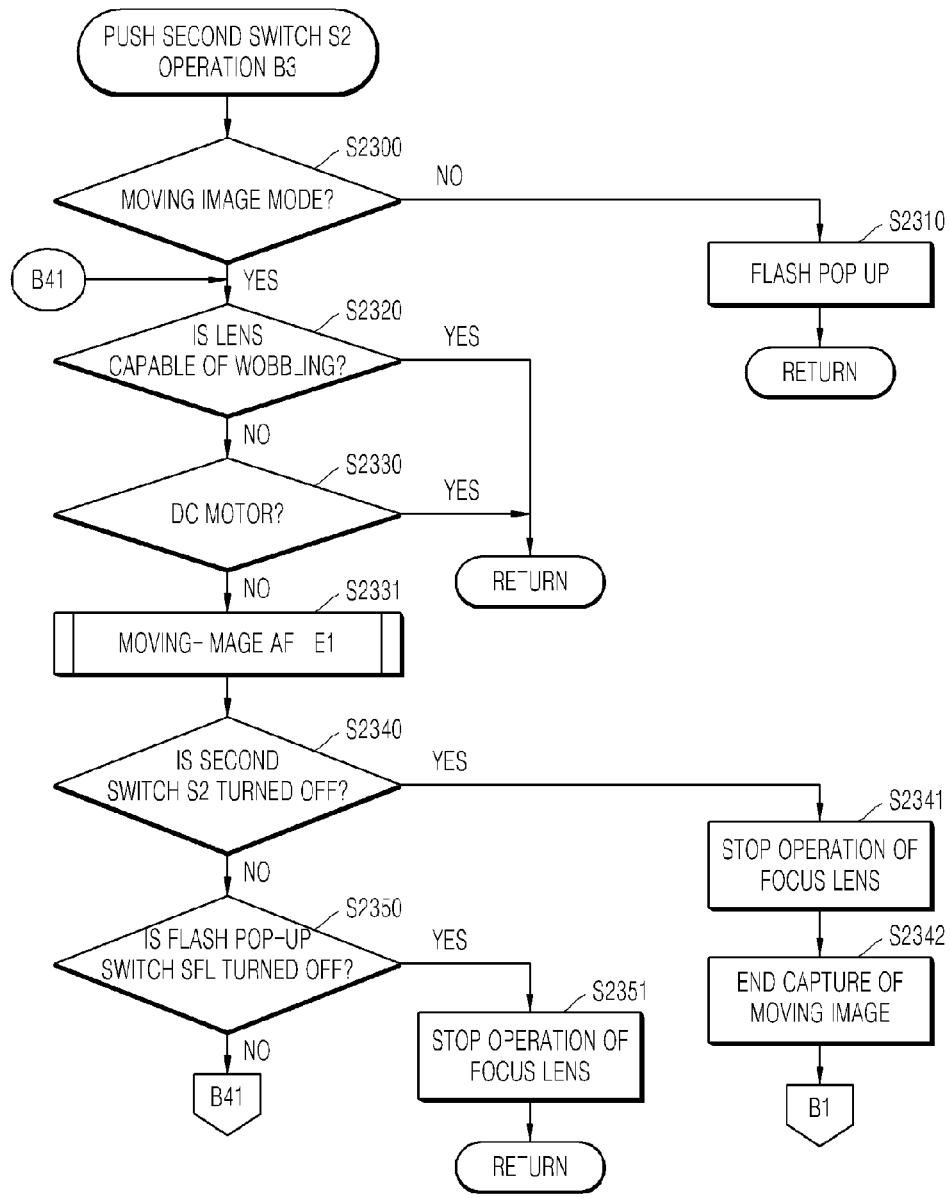
FIG. 23 is a flowchart of operation of a digital imaging apparatus when a flash pop-up switch SFL is turned on, according to another exemplary embodiment of the invention.

FIG. 23 is a flowchart of operation of a digital imaging apparatus when a flash pop-up switch SFL is pushed, according to another exemplary embodiment of the invention.

The flash pop-up switch SFL may be any one of the flash pop-up switch SFL of FIG. 6, the flash pop-up switch SFL 940 of the lens-fixing-type digital imaging apparatus of FIG. 9, and the flash pop-up switch SFL 760 of the interchangeable-lens-type digital imaging apparatus of FIG. 7.

When the flash pop-up switch SFL is pushed and turned on, it may be determined whether an image capture mode is a moving image mode or still image mode (S2300). When the image capture mode is the still image mode, a flash may be popped up (S2310) and the process returns.

When the image capture mode is the moving image mode, it may be determined whether a lens of the digital imaging apparatus is capable of wobbling (S2320). Since the lens capable of wobbling has already performed the AF operation when the second switch S2 is turned on, the process may return.

When the lens is incapable of wobbling, it may be determined whether a focus-lens actuator is a DC motor (S2330). When the focus-lens actuator is the DC motor, since the focus-lens actuator is inappropriate for capturing a moving image, the AF operation may not be performed, and the process may return. Otherwise, when the focus-lens actuator is not the DC motor, it may be determined that the AF operation is possible, so a moving-image AF operation E1 may be performed (S2331). Afterwards, it may be determined whether the second switch S2 is pushed again and turned off (S2340). When the second switch S2 is pushed again and turned off, operation of the focus lens may be stopped (S2341), the capture of the moving image may be stopped (S2342), and the process may return to operation B1 of FIG. 20 to display a live view.

In operation S2340, when the switch S2 is not pushed again, it may be confirmed whether a flash pop-up switch SFL is turned off (S2350). When the flash pop-up switch SFL is turned off, the operation of the focus lens may be ended to end the AF operation, and the process may return (S2351). Otherwise, when the flash pop-up switch is turned on, the process may return to operation S2320 to continuously perform the continuous AF operation.

According to embodiments of the invention, when a lens inappropriate for capturing a moving image is mounted, recording of unnecessary AF noise may be prevented using additional switches and buttons during an AF operation or capture of moving images using a MF function, and image flickering caused by a high-speed AF operation may be eliminated.

The switches disclosed above may generate signals.

A program configured to execute methods of driving digital imaging apparatuses according to the current embodiments and variations thereof may be stored in a computer recordable medium. Here, the recording medium may be, for example, the memory 210 of FIG. 2 or any other additional recording medium, which may be non-transitory. Examples of the recording medium include optical recording media and optical storage media.

The functionality associated with describing embodiments of the invention is described with a number of illustrative units. However, the units may be differently arranged so that the functionality of a single unit may be implemented with two or more units and the functionality of two or more units may be combined into a single unit. Moreover, the functionality may be differently arranged between illustrative units.

The various illustrative logics, units, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A digital imaging apparatus comprising:
a first switch configured to perform an auto-focus operation in an auto-focus mode;
a focus ring configured to perform a manual-focus operation in a manual-focus mode;
a second switch configured to capture a still image in any mode; and
a third switch configured to capture a moving image, in an auto-focus mode;
wherein the manual-focus operation is prevented from being performed during the auto-focus operation or capture of the still image, the auto-focus operation is stopped during the capture of the moving image by pushing the third switch, and the manual-focus operation is performed using the focus ring mounted on a lens.

2. A digital imaging apparatus comprising:
a first switch configured to perform an auto-focus operation in an auto-focus mode;
a focus ring configured to perform a manual focus operation in a manual-focus mode;
a second switch configured to capture a still image in any mode; and
a third switch configured to capture a moving image,
wherein the manual-focus operation is prevented from being performed during the auto-focus operation or the capture of the still image,
wherein when the apparatus determines that an interchangeable lens is appropriate for capturing the moving image based on received lens information indicating that the lens is capable of wobbling, operating the third switch includes performing the auto-focus operation by the apparatus during the capture of the moving image, and when the apparatus determines that the interchangeable lens is inappropriate for capturing the moving image based on received lens information indicating that the lens is not capable of wobbling, operating the third switch includes stopping the auto-focus operation by the apparatus and performing the manual-focus operation using the focus ring mounted in the interchangeable lens.

3. The apparatus of claim 1 or 2, wherein the second switch and the third switch are formed integrally with a common button.

4. A digital imaging apparatus comprising:
a first switch configured to half-push a shutter-release button;
a second switch configured to full-push the shutter-release button; and
a third switch configured to initiate capture of a moving image,
wherein when the apparatus determines that a lens of the digital imaging apparatus is inappropriate for capturing the moving image based on received lens information indicating that the lens is not capable of wobbling, a still image mode includes performing an auto-focus operation by the apparatus using the first switch and capturing a still image using the second switch, and a moving image mode includes initiating the capture of the moving image using the third switch and performing a manual-focus operation by manipulating a focus ring of the lens.

5. The apparatus of claim 4, wherein the lens information comprises information about whether the lens of the digital imaging apparatus is capable of wobbling or information regarding an auto-focus drive actuator.

6. The apparatus of claim 4, wherein the manual-focus operation is not performed during the capture of the still image or during the auto-focus operation.

7. A method of performing an auto-focus operation using a digital imaging apparatus comprising:
a first switch configured to perform an auto-focus operation in an auto-focus mode;
a focus ring configured to perform a manual-focus operation in a manual-focus mode;
a second switch configured to capture a still image in any mode; and
a third switch configured to capture a moving image,
the method comprising:
preventing the manual-focus operation during the auto-focus operation or the capture of the still image; and
initiating the capture of the moving image and simultaneously, stopping the auto-focus operation during operation of the third switch and performing the manual-focus operation using the focus ring mounted in a lens.

8. A method of performing an auto-focus operation using an interchangeable-lens-type digital imaging apparatus comprising:
a first switch configured to perform an auto-focus operation in an auto-focus mode;
a focus ring configured to perform a manual-focus operation in a manual-focus mode;
a second switch configured to capture a still image in any mode; and
a third switch configured to capture a moving image,
the method comprising:
preventing the manual-focus operation during the auto-focus operation or the capture of the still image;
initiating the capture of the moving image and simultaneously, performing the auto-focus operation by the apparatus during manipulation of the third switch when the apparatus determines that an interchangeable lens is appropriate for capturing the moving image based on received lens information indicating that the lens is capable of wobbling; and
initiating the capture of the moving image and stopping the auto-focus operation by the apparatus during the manipulation of the third switch and performing the manual-focus operation using the focus ring mounted in the interchangeable lens when the apparatus determines that the interchangeable lens is inappropriate for capturing the moving image.

9. A method of performing an auto-focus operation using a digital imaging apparatus comprising:
a first switch configured to perform an auto-focus operation in an auto-focus mode;
a focus ring configured to perform a manual focus manual-focus operation in a manual-focus mode;
a second switch configured to capture a still image in any mode; and
a third switch configured to capture a moving image,
the method comprising:
preventing the manual-focus operation during the auto-focus operation or the capture of the still image;
initiating the capture of the moving image and simultaneously, performing the auto-focus operation by the apparatus during manipulation of the third switch when the apparatus determines that an interchangeable lens is appropriate for capturing the moving image based on received lens information indicating that the lens is capable of wobbling; and initiating the capture of the moving image and stopping the auto-focus operation by the apparatus during the manipulation of the third switch when the apparatus determines that the interchangeable lens is inappropriate for capturing the moving image based on received lens information indicating that the lens is not capable of wobbling, and performing the manual-focus operation using a focus-lens drive manipulator during the capture of the moving image.

10. A method of performing an auto-focus operation using a digital imaging apparatus comprising:

a first switch configured to perform an auto-focus operation in an auto-focus mode;

a focus ring configured to perform a manual focus operation in a manual-focus mode;

a second switch configured to capture a still image; and a third switch configured to capture a moving image, the method comprising:

stopping the auto-focus operation during manipulation of the third switch and performing the manual-focus operation using a focus ring mounted in a lens; and preventing the manual-focus operation during the auto-focus operation or the capture of the still image.

11. A method of performing an auto-focus operation using a digital imaging apparatus comprising:

a first switch configured to perform an auto-focus operation in an auto-focus mode;

a focus ring configured to perform a manual focus operation in a manual-focus mode;

a second switch configured to capture a still image; and a third switch configured to capture a moving image, the method comprising:

preventing the manual focus operation during the auto-focus operation or the capture of the still image;

capturing the moving image and simultaneously, performing the auto-focus operation by pushing the third switch when the apparatus determines that an interchangeable lens is appropriate for capturing the moving image based on received lens information indicating that the lens is capable of wobbling; and stopping the auto-focus operation by the apparatus during manipulation of the third switch and performing the manual-focus operation using a focus ring mounted in a lens when the apparatus determines that the interchangeable lens is inappropriate for capturing the moving image based on received lens information indicating that the lens is not capable of wobbling.

12. The method of claim 10 or 11, wherein the focus ring further comprises:

a leftward switch configured to drive a focus lens backward; and a rightward switch configured to drive the focus lens forward, wherein the manual-focus operation is performed using the leftward switch or the rightward switch.

13. A method of performing an auto-focus operation using a digital imaging apparatus comprising:

a first switch S1;

a second switch S2; and a third switch SMV, the method comprising:

determining by the apparatus whether a lens of the digital imaging apparatus is appropriate for capturing the moving image based on received lens information indicating whether or not the lens is capable of wobbling;

performing the auto-focus operation using the first switch and capturing a still image using the second switch in a still image mode;

initiating the capture of the moving image using the third switch in a moving image mode; and performing a manual-focus operation by manipulating a focus ring of the lens during the capture of the moving image when the apparatus determines that the lens of the digital imaging apparatus is inappropriate for capturing the moving image based on received lens information indicating that the lens is not capable of wobbling.

14. The method of claim 13, wherein the first switch is a preview switch configured to indicate a depth of field or a flash switch configured to pop up an internal flash.

15. The method of claim 14, wherein the preview switch performs an auto-focus lock function or a preview function in a still image mode, and the flash switch pops up the internal flash in the still image mode.

16. A method of performing an auto-focus operation using a digital imaging apparatus, the method comprising:

performing the auto-focus operation during capture of a moving image when the apparatus determines that a lens of the digital imaging apparatus is appropriate for capturing the moving image based on received lens information indicating that the lens is capable of wobbling; and stopping the auto-focus operation by the apparatus during the capture of the moving image when the apparatus determines that the lens of the digital imaging apparatus is inappropriate for capturing the moving image based on received lens information indicating that the lens is not capable of wobbling, wherein the auto-focus operation is performed by pushing a first switch.

17. The method of claim 13 or 16, wherein the lens information comprises information about whether the lens of the digital imaging apparatus is capable of wobbling or information regarding an auto-focus drive actuator.

* * * * *